(12) United States Patent
Julian et al.

(10) Patent No.: US 8,552,903 B2
(45) Date of Patent: Oct. 8, 2013

(54) VERIFIED DISTANCE RANGING

(75) Inventors: David Jonathan Julian, San Diego, CA (US); Amal Ekbal, San Diego, CA (US); Chong U. Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/735,867

(22) Filed: Apr. 16, 2007

(65) Prior Publication Data

US 2007/0285306 A1    Dec. 13, 2007

Related U.S. Application Data

(60) Provisional application No. 60/793,189, filed on Apr. 18, 2006.

(51) Int. Cl.
*G01S 13/74* (2006.01)
*G01S 13/08* (2006.01)

(52) U.S. Cl.
USPC .............................. 342/43; 342/118; 342/125

(58) Field of Classification Search
USPC .................... 342/43, 42, 44, 45, 118, 125; 340/426.13–426.17, 5.2–5.86
See application file for complete search history.

(56) References Cited

U.S. PATENT DOCUMENTS

| | | | |
|---|---|---|---|
| 4,006,477 A * | 2/1977 | Yost et al. | 342/51 |
| 5,382,957 A * | 1/1995 | Blume | 342/43 |
| 5,687,169 A | 11/1997 | Fullerton | |
| 5,764,696 A | 6/1998 | Barnes et al. | |
| 5,812,081 A | 9/1998 | Fullerton | |
| 5,832,035 A | 11/1998 | Fullerton | |
| 5,907,427 A | 5/1999 | Scalora et al. | |
| 5,952,956 A | 9/1999 | Fullerton | |
| 5,960,031 A | 9/1999 | Fullerton et al. | |
| 5,963,581 A | 10/1999 | Fullerton et al. | |
| 5,969,663 A | 10/1999 | Fullerton et al. | |

(Continued)

FOREIGN PATENT DOCUMENTS

| | | |
|---|---|---|
| CN | 1672382 | 9/2005 |
| CN | 1716223 A | 1/2006 |

(Continued)

OTHER PUBLICATIONS

International Search Report—PCT/US07/066903—International Search Authority, European Patent Office—Sep. 25, 2007.

(Continued)

*Primary Examiner* — Cassie Galt
(74) *Attorney, Agent, or Firm* — Won Tae Kim

(57) ABSTRACT

Various techniques are described relating to verifying a distance between devices. A distance between two devices may be verified by requiring one of the devices to take one or more actions that generate a result that is only possible if the device is at most a given distance from the other device. In some aspects verified ranging is accomplished through the use of a ranging signal and a responsive signal. In some aspects the ranging signal may comprise a random, pseudorandom, or deterministic sequence. A responding device may operate on a ranging signal in accordance with a known function to generate a responsive signal. A ranging device also may perform operations to determine the likelihood that a responding device properly operated on a ranging signal that the ranging device transmitted to the responding device.

91 Claims, 7 Drawing Sheets

(56) References Cited

U.S. PATENT DOCUMENTS

| | | | |
|---|---|---|---|
| 5,970,148 A * | 10/1999 | Meier | 713/168 |
| 5,995,534 A | 11/1999 | Fullerton et al. | |
| 6,025,795 A * | 2/2000 | Hulderman et al. | 342/45 |
| 6,031,862 A | 2/2000 | Fullerton et al. | |
| 6,091,374 A | 7/2000 | Barnes | |
| 6,111,536 A | 8/2000 | Richards et al. | |
| 6,133,876 A | 10/2000 | Fullerton et al. | |
| 6,177,903 B1 | 1/2001 | Fullerton et al. | |
| 6,218,979 B1 | 4/2001 | Barnes et al. | |
| 6,295,019 B1 | 9/2001 | Richards et al. | |
| 6,297,773 B1 | 10/2001 | Fullerton et al. | |
| 6,300,903 B1 | 10/2001 | Richards et al. | |
| 6,304,623 B1 | 10/2001 | Richards et al. | |
| 6,332,193 B1 | 12/2001 | Glass et al. | |
| 6,351,652 B1 | 2/2002 | Finn et al. | |
| 6,354,946 B1 | 3/2002 | Finn | |
| 6,400,307 B2 | 6/2002 | Fullerton et al. | |
| 6,400,329 B1 | 6/2002 | Barnes | |
| 6,421,389 B1 | 7/2002 | Jett et al. | |
| 6,430,208 B1 | 8/2002 | Fullerton et al. | |
| 6,437,756 B1 | 8/2002 | Schantz | |
| 6,462,701 B1 | 10/2002 | Finn | |
| 6,466,125 B1 | 10/2002 | Richards et al. | |
| 6,469,628 B1 | 10/2002 | Richards et al. | |
| 6,483,461 B1 | 11/2002 | Matheney et al. | |
| 6,489,893 B1 | 12/2002 | Richards et al. | |
| 6,492,904 B2 | 12/2002 | Richards | |
| 6,492,906 B1 | 12/2002 | Richards et al. | |
| 6,501,393 B1 | 12/2002 | Richards et al. | |
| 6,504,483 B1 | 1/2003 | Richards et al. | |
| 6,512,455 B2 | 1/2003 | Finn et al. | |
| 6,512,488 B2 | 1/2003 | Schantz | |
| 6,519,464 B1 | 2/2003 | Santhoff et al. | |
| 6,529,568 B1 | 3/2003 | Richards et al. | |
| 6,538,615 B1 | 3/2003 | Schantz | |
| 6,539,213 B1 | 3/2003 | Richards et al. | |
| 6,549,567 B1 | 4/2003 | Fullerton | |
| 6,552,677 B2 | 4/2003 | Barnes et al. | |
| 6,556,621 B1 | 4/2003 | Richards et al. | |
| 6,560,463 B1 | 5/2003 | Santhoff | |
| 6,571,089 B1 | 5/2003 | Richards et al. | |
| 6,573,857 B2 | 6/2003 | Fullerton et al. | |
| 6,577,691 B2 | 6/2003 | Richards et al. | |
| 6,585,597 B2 | 7/2003 | Finn | |
| 6,593,886 B2 | 7/2003 | Schantz | |
| 6,606,051 B1 | 8/2003 | Fullerton et al. | |
| 6,611,234 B2 | 8/2003 | Fullerton et al. | |
| 6,614,384 B2 | 9/2003 | Hall et al. | |
| 6,614,387 B1 | 9/2003 | Deadman | |
| 6,621,462 B2 | 9/2003 | Barnes | |
| 6,636,566 B1 | 10/2003 | Roberts et al. | |
| 6,636,567 B1 | 10/2003 | Roberts et al. | |
| 6,636,573 B2 | 10/2003 | Richards et al. | |
| 6,642,903 B2 | 11/2003 | Schantz | |
| 6,650,894 B1 | 11/2003 | Berstis et al. | |
| 6,661,342 B2 | 12/2003 | Hall et al. | |
| 6,667,724 B2 | 12/2003 | Barnes et al. | |
| 6,670,909 B2 | 12/2003 | Kim | |
| 6,671,310 B1 | 12/2003 | Richards et al. | |
| 6,674,396 B2 | 1/2004 | Richards et al. | |
| 6,677,796 B2 | 1/2004 | Brethour et al. | |
| 6,700,538 B1 | 3/2004 | Richards | |
| 6,710,736 B2 | 3/2004 | Fullerton et al. | |
| 6,717,992 B2 | 4/2004 | Cowie et al. | |
| 6,748,040 B1 | 6/2004 | Johnson et al. | |
| 6,750,757 B1 | 6/2004 | Gabig, Jr. et al. | |
| 6,759,948 B2 | 7/2004 | Grisham et al. | |
| 6,760,387 B2 | 7/2004 | Langford et al. | |
| 6,762,712 B2 | 7/2004 | Kim | |
| 6,763,057 B1 | 7/2004 | Fullerton et al. | |
| 6,763,282 B2 | 7/2004 | Glenn et al. | |
| 6,774,764 B2 * | 8/2004 | Ghosh et al. | 340/5.61 |
| 6,774,846 B2 | 8/2004 | Fullerton et al. | |
| 6,774,859 B2 | 8/2004 | Schantz et al. | |
| 6,778,603 B1 | 8/2004 | Fullerton et al. | |
| 6,781,530 B2 | 8/2004 | Moore | |
| 6,782,048 B2 | 8/2004 | Santhoff | |
| 6,788,730 B1 | 9/2004 | Richards et al. | |
| 6,822,604 B2 | 11/2004 | Hall et al. | |
| 6,823,022 B1 | 11/2004 | Fullerton et al. | |
| 6,836,223 B2 | 12/2004 | Moore | |
| 6,836,226 B2 | 12/2004 | Moore | |
| 6,844,816 B1 | 1/2005 | Melton et al. | |
| 6,845,253 B1 | 1/2005 | Schantz | |
| 6,847,675 B2 | 1/2005 | Fullerton et al. | |
| 6,862,575 B1 | 3/2005 | Anttila et al. | |
| 6,879,878 B2 | 4/2005 | Glenn et al. | |
| 6,882,301 B2 | 4/2005 | Fullerton | |
| 6,895,034 B2 | 5/2005 | Nunally et al. | |
| 6,895,236 B2 * | 5/2005 | Shuster | 455/410 |
| 6,900,732 B2 | 5/2005 | Richards | |
| 6,906,625 B1 | 6/2005 | Taylor et al. | |
| 6,907,244 B2 | 6/2005 | Santhoff et al. | |
| 6,912,240 B2 | 6/2005 | Kumar et al. | |
| 6,914,949 B2 | 7/2005 | Richards et al. | |
| 6,917,284 B2 | 7/2005 | Grisham et al. | |
| 6,919,838 B2 | 7/2005 | Santhoff | |
| 6,922,166 B2 | 7/2005 | Richards et al. | |
| 6,922,177 B2 | 7/2005 | Barnes et al. | |
| 6,925,109 B2 | 8/2005 | Richards et al. | |
| 6,933,882 B2 | 8/2005 | Fullerton | |
| 6,937,639 B2 | 8/2005 | Pendergrass et al. | |
| 6,937,663 B2 | 8/2005 | Jett et al. | |
| 6,937,667 B1 | 8/2005 | Fullerton et al. | |
| 6,937,674 B2 | 8/2005 | Santhoff et al. | |
| 6,947,492 B2 | 9/2005 | Santhoff et al. | |
| 6,950,485 B2 | 9/2005 | Richards et al. | |
| 6,954,480 B2 | 10/2005 | Richards et al. | |
| 6,959,031 B2 | 10/2005 | Haynes et al. | |
| 6,959,032 B1 | 10/2005 | Richards et al. | |
| 6,961,285 B2 * | 11/2005 | Niemiec et al. | 368/10 |
| 6,961,541 B2 * | 11/2005 | Overy et al. | 455/41.2 |
| 6,963,727 B2 | 11/2005 | Shreve | |
| 6,980,613 B2 | 12/2005 | Krivokapic | |
| 6,989,751 B2 | 1/2006 | Richards | |
| 7,002,473 B2 * | 2/2006 | Glick et al. | 340/572.1 |
| 7,003,289 B1 | 2/2006 | Kolls | |
| 7,010,290 B2 | 3/2006 | Dent | |
| 7,015,793 B2 | 3/2006 | Gabig, Jr. et al. | |
| 7,020,224 B2 | 3/2006 | Krivokapic | |
| 7,027,425 B1 | 4/2006 | Fullerton et al. | |
| 7,027,483 B2 | 4/2006 | Santhoff et al. | |
| 7,027,493 B2 | 4/2006 | Richards | |
| 7,030,806 B2 | 4/2006 | Fullerton | |
| 7,039,392 B2 | 5/2006 | McCorkle et al. | |
| 7,042,417 B2 | 5/2006 | Santhoff et al. | |
| 7,046,187 B2 | 5/2006 | Fullerton et al. | |
| 7,046,618 B2 | 5/2006 | Santhoff et al. | |
| 7,058,414 B1 | 6/2006 | Rofheart et al. | |
| 7,069,111 B2 | 6/2006 | Glenn et al. | |
| 7,075,476 B2 | 7/2006 | Kim | |
| 7,079,827 B2 | 7/2006 | Richards et al. | |
| 7,098,769 B2 | 8/2006 | Ott | |
| 7,099,367 B2 | 8/2006 | Richards et al. | |
| 7,099,368 B2 | 8/2006 | Santhoff et al. | |
| 7,116,266 B1 * | 10/2006 | Vesel et al. | 342/30 |
| 7,119,659 B2 | 10/2006 | Bonalle et al. | |
| 7,129,886 B2 | 10/2006 | Hall et al. | |
| 7,132,975 B2 | 11/2006 | Fullerton et al. | |
| 7,139,647 B2 * | 11/2006 | Larsen | 701/21 |
| 7,145,954 B1 | 12/2006 | Pendergrass et al. | |
| 7,148,791 B2 | 12/2006 | Grisham et al. | |
| 7,151,490 B2 | 12/2006 | Richards | |
| 7,167,525 B2 | 1/2007 | Santhoff et al. | |
| 7,170,408 B2 | 1/2007 | Taylor et al. | |
| 7,178,719 B2 | 2/2007 | Silverbrook et al. | |
| 7,181,192 B2 | 2/2007 | Panasik et al. | |
| 7,184,938 B1 | 2/2007 | Lansford et al. | |
| 7,188,244 B2 | 3/2007 | Matsuno | |
| 7,190,722 B2 | 3/2007 | Lakkis et al. | |
| 7,190,729 B2 | 3/2007 | Siwiak | |
| 7,206,334 B2 | 4/2007 | Siwiak | |
| 7,209,724 B2 | 4/2007 | Richards et al. | |
| 7,209,753 B2 | 4/2007 | Raith | |

| | | |
|---|---|---|
| 7,230,980 B2 | 6/2007 | Langford et al. |
| 7,239,277 B2 | 7/2007 | Fullerton et al. |
| 7,245,900 B1 | 7/2007 | Lamb et al. |
| RE39,759 E | 8/2007 | Fullerton |
| 7,256,727 B2 | 8/2007 | Fullerton et al. |
| 7,271,779 B2 | 9/2007 | Hertel |
| 7,308,356 B2 | 12/2007 | Melaku et al. |
| 7,310,532 B2 | 12/2007 | Knauerhase et al. |
| 7,363,494 B2 | 4/2008 | Brainard et al. |
| 7,366,509 B2 | 4/2008 | Akgun et al. |
| 7,383,984 B2 | 6/2008 | Silverbrook et al. |
| 7,398,392 B2 | 7/2008 | Weber |
| 7,505,443 B2 | 3/2009 | McNew et al. |
| 7,554,979 B2 | 6/2009 | Ikeda |
| 7,581,113 B2 | 8/2009 | Smith et al. |
| 7,724,705 B2 | 5/2010 | Erola et al. |
| 7,739,157 B2 | 6/2010 | Bonner et al. |
| 7,783,532 B2 | 8/2010 | Hsu et al. |
| 7,818,762 B2 | 10/2010 | Liu et al. |
| 7,870,021 B2 | 1/2011 | Mankoff |
| 7,870,229 B2 | 1/2011 | Spector |
| 2001/0014870 A1 | 8/2001 | Saito et al. |
| 2001/0042010 A1 | 11/2001 | Hassell |
| 2002/0010627 A1 | 1/2002 | Lerat |
| 2002/0046084 A1 | 4/2002 | Steele et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0107738 A1 | 8/2002 | Beach et al. |
| 2002/0111140 A1 | 8/2002 | Kim |
| 2002/0111907 A1 | 8/2002 | Ling |
| 2002/0116271 A1 | 8/2002 | Mankoff |
| 2002/0128903 A1 | 9/2002 | Kernahan |
| 2002/0138345 A1 | 9/2002 | Dickson et al. |
| 2002/0138346 A1 | 9/2002 | Kodaka et al. |
| 2002/0169892 A1 | 11/2002 | Miyaoku et al. |
| 2002/0178060 A1 | 11/2002 | Sheehan |
| 2002/0194303 A1 | 12/2002 | Suila et al. |
| 2003/0004808 A1 | 1/2003 | Elhaoussine et al. |
| 2003/0004821 A1 | 1/2003 | Dutta et al. |
| 2003/0074259 A1 | 4/2003 | Slyman, Jr. et al. |
| 2003/0093314 A1 | 5/2003 | Leung et al. |
| 2003/0115152 A1 | 6/2003 | Flaherty |
| 2003/0117635 A1 | 6/2003 | Roberts |
| 2003/0158796 A1 | 8/2003 | Balent |
| 2003/0195806 A1 | 10/2003 | Willman et al. |
| 2003/0217153 A1 | 11/2003 | Rao et al. |
| 2004/0054592 A1 | 3/2004 | Hernblad |
| 2004/0054732 A1 | 3/2004 | Carter et al. |
| 2004/0064351 A1 | 4/2004 | Mikurak |
| 2004/0117250 A1 | 6/2004 | Lubow et al. |
| 2004/0137886 A1 | 7/2004 | Ross et al. |
| 2004/0143500 A1 | 7/2004 | Lopez et al. |
| 2004/0158492 A1 | 8/2004 | Lopez et al. |
| 2004/0203963 A1 | 10/2004 | Shivaram et al. |
| 2004/0218574 A1 | 11/2004 | Sata et al. |
| 2004/0222302 A1 | 11/2004 | Matsumori |
| 2004/0233621 A1 | 11/2004 | Maeoka et al. |
| 2004/0240565 A1 | 12/2004 | Santhoff et al. |
| 2004/0243519 A1 | 12/2004 | Perttila et al. |
| 2004/0254836 A1 | 12/2004 | Emoke Barabas et al. |
| 2005/0027984 A1 | 2/2005 | Saito et al. |
| 2005/0038574 A1 | 2/2005 | Gila et al. |
| 2005/0040230 A1 | 2/2005 | Swartz et al. |
| 2005/0114213 A1 | 5/2005 | Smith et al. |
| 2005/0131761 A1 | 6/2005 | Trika et al. |
| 2005/0132234 A1 | 6/2005 | Dawson |
| 2005/0135304 A1 | 6/2005 | Wentink et al. |
| 2005/0138576 A1 | 6/2005 | Baumert et al. |
| 2005/0184145 A1 | 8/2005 | Law et al. |
| 2005/0184908 A1 | 8/2005 | Richards |
| 2005/0204152 A1 | 9/2005 | Breitbach |
| 2005/0230473 A1 | 10/2005 | Fajkowski |
| 2005/0237270 A1 | 10/2005 | Adams et al. |
| 2006/0003776 A1 | 1/2006 | Natori et al. |
| 2006/0014532 A1 | 1/2006 | Seligmann et al. |
| 2006/0015404 A1 | 1/2006 | Tran |
| 2006/0026070 A1 | 2/2006 | Sun |
| 2006/0030341 A1 | 2/2006 | Pham |
| 2006/0068822 A1 | 3/2006 | Kalhan |
| 2006/0073851 A1 | 4/2006 | Colando et al. |
| 2006/0074784 A1 | 4/2006 | Brown |
| 2006/0111967 A1 | 5/2006 | Forbes |
| 2006/0177030 A1 | 8/2006 | Rajagopalan et al. |
| 2006/0178932 A1 | 8/2006 | Lang |
| 2006/0180664 A1 | 8/2006 | Barrett et al. |
| 2006/0194569 A1 | 8/2006 | Hsueh |
| 2007/0017259 A1 | 1/2007 | Cho et al. |
| 2007/0057051 A1 | 3/2007 | Bortolin et al. |
| 2007/0061302 A1 | 3/2007 | Ramer et al. |
| 2007/0087732 A1 | 4/2007 | Hsueh |
| 2007/0131759 A1 | 6/2007 | Cox et al. |
| 2007/0136657 A1 | 6/2007 | Blumenthal et al. |
| 2007/0138270 A1 | 6/2007 | Reblin |
| 2007/0150339 A1 | 6/2007 | Retter et al. |
| 2007/0173266 A1 | 7/2007 | Barnes, Jr. |
| 2007/0174116 A1 | 7/2007 | Keith et al. |
| 2007/0174259 A1 | 7/2007 | Amjadi |
| 2007/0200671 A1* | 8/2007 | Kelley et al. .............. 340/5.72 |
| 2007/0203792 A1 | 8/2007 | Rao |
| 2007/0249288 A1 | 10/2007 | Moallemi et al. |
| 2007/0259690 A1 | 11/2007 | Julian et al. |
| 2007/0270129 A1 | 11/2007 | Luo |
| 2007/0276537 A1 | 11/2007 | Walker et al. |
| 2007/0287386 A1 | 12/2007 | Agrawal et al. |
| 2008/0040229 A1 | 2/2008 | Gholston |
| 2008/0052169 A1 | 2/2008 | O'shea et al. |
| 2008/0072066 A1 | 3/2008 | Vogler et al. |
| 2008/0074264 A1 | 3/2008 | Sharpe et al. |
| 2008/0120186 A1 | 5/2008 | Jokinen et al. |
| 2008/0133366 A1 | 6/2008 | Evans et al. |
| 2008/0154827 A1 | 6/2008 | Connors |
| 2008/0167991 A1 | 7/2008 | Carlson et al. |
| 2008/0189170 A1 | 8/2008 | Ramachandra |
| 2008/0208688 A1 | 8/2008 | Byerley et al. |
| 2008/0221984 A1 | 9/2008 | Abhyanker |
| 2008/0238615 A1 | 10/2008 | Carpenter |
| 2008/0240440 A1 | 10/2008 | Rose et al. |
| 2008/0262928 A1 | 10/2008 | Michaelis |
| 2008/0300984 A1 | 12/2008 | Li |
| 2009/0061884 A1 | 3/2009 | Rajan et al. |
| 2009/0076911 A1 | 3/2009 | Vo et al. |
| 2009/0076912 A1 | 3/2009 | Rajan et al. |
| 2009/0088182 A1 | 4/2009 | Piersol et al. |
| 2009/0098903 A1 | 4/2009 | Donaldson et al. |
| 2009/0108064 A1 | 4/2009 | Fernandes et al. |
| 2009/0178144 A1 | 7/2009 | Redlich et al. |
| 2009/0233575 A1 | 9/2009 | Morrison |
| 2010/0153205 A1 | 6/2010 | Retter et al. |
| 2010/0185504 A1 | 7/2010 | Rajan et al. |
| 2010/0241574 A1 | 9/2010 | Salazar |
| 2010/0257020 A1 | 10/2010 | Bryant et al. |
| 2010/0280960 A1 | 11/2010 | Ziotopoulos et al. |
| 2010/0289640 A1 | 11/2010 | Annamalai |
| 2010/0299224 A1 | 11/2010 | Borom et al. |
| 2011/0028160 A1 | 2/2011 | Roeding et al. |
| 2011/0119132 A1 | 5/2011 | Morton et al. |
| 2011/0215138 A1 | 9/2011 | Crum |
| 2011/0276385 A1 | 11/2011 | Keller |
| 2012/0239500 A1 | 9/2012 | Monahan |

FOREIGN PATENT DOCUMENTS

| | | |
|---|---|---|
| EP | 1926335 A1 | 5/2008 |
| JP | 11353555 A | 12/1999 |
| JP | 2000275328 A | 10/2000 |
| JP | 2002074131 A | 3/2002 |
| JP | 2002109237 A | 4/2002 |
| JP | 2002149945 A | 5/2002 |
| JP | 2002525641 A | 8/2002 |
| JP | 2002251555 A | 9/2002 |
| JP | 2002279274 A | 9/2002 |
| JP | 2002291047 | 10/2002 |
| JP | 2002374261 A | 12/2002 |
| JP | 2003006543 A | 1/2003 |
| JP | 2003023367 A | 1/2003 |
| JP | 2003051771 | 2/2003 |
| JP | 2003067606 A | 3/2003 |
| JP | 2003187140 A | 7/2003 |

| | | | |
|---|---|---|---|
| JP | 2003208381 A | 7/2003 |
| JP | 2003256705 A | 9/2003 |
| JP | 2003263582 A | 9/2003 |
| JP | 2004094543 A | 3/2004 |
| JP | 2004220522 A | 8/2004 |
| JP | 2004236166 A | 8/2004 |
| JP | 2004248215 A | 9/2004 |
| JP | 2004272463 A | 9/2004 |
| JP | 2004326303 A | 11/2004 |
| JP | 2004328542 A | 11/2004 |
| JP | 2004362470 A | 12/2004 |
| JP | 2005011318 A | * | 1/2005 |
| JP | 2005011318 A | 1/2005 |
| JP | 2005020350 A | 1/2005 |
| JP | 2005045756 A | 2/2005 |
| JP | 2005128903 A | 5/2005 |
| JP | 2005128903 A | * | 5/2005 |
| JP | 2005128965 A | 5/2005 |
| JP | 2005141686 A | 6/2005 |
| JP | 2005209114 A | 8/2005 |
| JP | 2005528016 A | 9/2005 |
| JP | 2005533316 A | 11/2005 |
| JP | 2006018511 A | 1/2006 |
| JP | 2006018824 A | 1/2006 |
| JP | 2006020004 A | 1/2006 |
| JP | 2006091355 A | 4/2006 |
| JP | 2006129000 A | 5/2006 |
| JP | 2006139431 A | 6/2006 |
| JP | 2006-197458 | 7/2006 |
| JP | 2006227901 A | 8/2006 |
| JP | 2006295249 A | 10/2006 |
| JP | 2007502087 A | 2/2007 |
| JP | 2007201851 A | 8/2007 |
| JP | 2007213276 A | 8/2007 |
| JP | 2008225540 A | 9/2008 |
| JP | 2008293123 A | 12/2008 |
| JP | 2009516989 | 4/2009 |
| JP | 2009188922 | 8/2009 |
| JP | 2010515168 A | 5/2010 |
| KR | 1020020068945 | 8/2002 |
| KR | 20020096946 A | 12/2002 |
| KR | 20040069122 A | 8/2004 |
| KR | 20060014942 A | 2/2006 |
| KR | 20060064222 A | 6/2006 |
| KR | 20060124430 A | 12/2006 |
| KR | 20070016301 | 2/2007 |
| RU | 2150790 C1 | 6/2000 |
| RU | 2267156 C2 | 12/2005 |
| RU | 20050100782 | 2/2006 |
| RU | 2301450 C2 | 6/2007 |
| TW | I228364 | 2/2005 |
| TW | I252324 | 4/2006 |
| TW | I252628 | 4/2006 |
| TW | I252639 | 4/2006 |
| TW | I252671 | 4/2006 |
| WO | WO9613920 A1 | 5/1996 |
| WO | WO0178423 A1 | 10/2001 |
| WO | WO0221478 | 3/2002 |
| WO | WO0225823 | 3/2002 |
| WO | 0250732 A1 | 6/2002 |
| WO | WO02054353 A1 | 7/2002 |
| WO | WO03107289 | 12/2003 |
| WO | WO2004008276 A2 | 1/2004 |
| WO | 2005122483 A1 | 12/2005 |
| WO | WO2006030341 | 3/2006 |
| WO | WO2006092772 A1 | 9/2006 |
| WO | 2007026745 A1 | 3/2007 |
| WO | WO2008027965 | 3/2008 |
| WO | 2008146576 A1 | 12/2008 |
| WO | WO2008157806 | 12/2008 |

OTHER PUBLICATIONS

Written Opinion—PCT/US07/066903—International Search Authority, European Patent Office—Sep. 25, 2007.
International Preliminary Report on Patentability—PCT/US07/066903—The International Bureau of WIPO, Geneva, Switzerland—Oct. 22, 2008.
Blundo, C. et al.: "Secure E-Coupons," Electronic Commerce Research, vol. 5, No. 1, pp. 117-139, Kluwer, Dordrecth, NL, (Jan. 1, 2005), XP002380651, ISSN: 1389-5753, Section 8.4.
Taiwan Search Report—TW096113703—TIPO—Jun. 4, 2011.
Bardia Alavi, et al., "Indoor Geolocation Distance Error Modeling using UWB Channel Measurements", 2005 IEEE 16th International Symposium on Personal, Indoor and Mobile Radio Communications, Sep. 11-14, 2005.
"Examples of Judging whether Business-Related Inventions are Patentable" http://www.jpo.go.jp/tetuzuki/t_tokkyo/bijinesu/biz_pat_case.htm.
"Examples of Judging whether Business-Related Inventions are Patentable" , http://www.jpo.go.jp/tetuzuki/t_tokkyo/bijinesu/biz_pat_case.htm, Apr. 18, 2003.
Okazaki, "Eight Methods for Capitalizing on Access Log Analysis, which are Essential to SEO, Marketing and Redesign", Web Creators, NdN Corporation, Japan, Mar. 1, 2005, vol. 39, pp. 148-155.
Co-pending U.S. Appl. No. 13/048,060, filed Mar. 15, 2011.
Co-pending U.S. Appl. No. 13/363,580, filed Feb. 1, 2012.

* cited by examiner

VERIFIED DISTANCE RANGING

CLAIM OF PRIORITY UNDER 35 U.S.C. §119

This application claims the benefit of and priority to U.S. Provisional Patent Application No. 60/793,189, filed Apr. 18, 2006, and assigned to the assignee hereof, the disclosure of which is hereby incorporated by reference herein.

BACKGROUND

1. Field

This application relates generally to distance ranging, and to distance ranging verification.

2. Background

Distance ranging involves determining a distance between two locations. In a typical scenario a device such as a rangefinder measures a distance from the rangefinder to another object. A distance ranging device may employ a variety of technologies such as laser, radar, sonar, and various forms of radio-frequency ("RF") signaling. For convenience, the term distance ranging will be referred to herein simply as ranging.

Ranging may be employed in a communication system through the use of RF signaling. For example, in a wireless communication system a ranging device may determine the amount of time it takes for a signal to travel from the ranging device to another device, the amount of time it takes for a signal to travel from the other device to the ranging device, or both. The ranging device may then calculate the distance between the devices based on any of these times and the known propagation speed of the RF signals (e.g., the speed of light).

Some systems employ a two-way message exchange mechanism to measure the relative distance between two devices. For example, a first device may send a ranging packet to second device. The second device may then send a reply packet back to the first device whereby the reply packet indicates the amount of time it took the second device to transmit the reply packet after receiving the ranging packet (i.e., second device's turnaround time). The first device may then use this turnaround time to determine the actual propagation time of the packets. Here, the first device calculates the total round-trip time as the amount of time that elapsed from the time it transmitted the ranging packet to the time it received the reply packet. The first device may then determine the actual propagation time by subtracting the turnaround time from the total round-trip time.

In practice, this form of two-way message exchange ranging is susceptible to being compromised by the second device. For example, the second device may send false information to the first device in the reply packet to make it appear to the first device that the second device is closer than it actually is. For example, the second device may report that it received the ranging packet from the first device earlier than it actually did and also report that it transmitted the reply packet at a later time than it actually did.

One approach for addressing this problem is to authenticate the second device to the first device using a public/private key exchange and an authentication server. Once authenticated, the first device may then trust the information reported by the second device. In practice, however, ranging authentication also may be needed for devices that can not be trusted in this manner. Accordingly, a need exists for more reliable ranging techniques.

SUMMARY

A summary of sample aspects of the disclosure follows. For convenience, one or more aspects of the disclosure may be referred to herein simply as "some aspects."

The disclosure relates in some aspects to ranging techniques. For example, ranging techniques may be employed to verify or determine a distance between two wireless communication devices.

The disclosure also relates in some aspects to verified ranging. For example, verified ranging may be used to determine whether the distance between two devices is valid or is within an allowable range. Verified ranging also may be used to verify the accuracy of a determined distance between two devices. Here, verified ranging may be used to ensure that the distance between a ranging device and a responding device is less than or equal to a given distance.

In some aspects a distance may be verified based on whether a device (e.g., a responding device) is capable of performing a certain action. Here, the action may be defined such that the device can only perform the action (e.g., generate a particular result) if the device is within a certain range of another device (e.g., a ranging device). For example, in a system employing two-way message exchange ranging a responding device may (e.g., may be required to) transmit a signal in response to a received ranging signal within a defined amount of time (e.g., a defined turnaround time). Here, the defined turnaround time may be defined to be relatively insignificant with respect to the true round-trip propagation time associated with an expected measured distance. The ranging device may then verify the distance between the devices by determining whether the total measured round-trip time is less than or equal to the expected round-trip time plus the defined turnaround time. In this way, the distance the spoofing device may spoof is limited by the defined turnaround time.

In some aspects a ranging signal may comprise a random, pseudorandom, or deterministic sequence. For example, a ranging signal may comprise a sequence of pulses where each pulse has a randomly selected value. In this case, a proper response signal from a responding device will correspond to the sequence of the ranging signal.

In some aspects a responding device generates a response signal by operating on a ranging signal in accordance with a function that is based on a known signal response scheme. For example, the responding device may utilize the function to operate on information represented by (e.g., sent in) the ranging signal. The responding device then transmits the processed information to a ranging device that has knowledge of the signal response scheme, and hence the function. The ranging device may thus verify that the information it receives from the responding device has been properly processed using the function, and is not been spoofed in some manner.

In some aspects a ranging device determines the likelihood (e.g., a probability) that the responding device properly operated on a ranging signal that the ranging device sent to the responding device. For example, the ranging device may employ statistical analysis to process the response signal received from the responding device to obtain a level of confidence as to whether the responding device is actually responding to the ranging signal or is attempting to spoof a response to the ranging signal.

BRIEF DESCRIPTION OF THE DRAWINGS

These and other features, aspects and advantages of the disclosure will be more fully understood when considered with respect to the following detailed description, appended claims and accompanying drawings, wherein:

Figure 1:
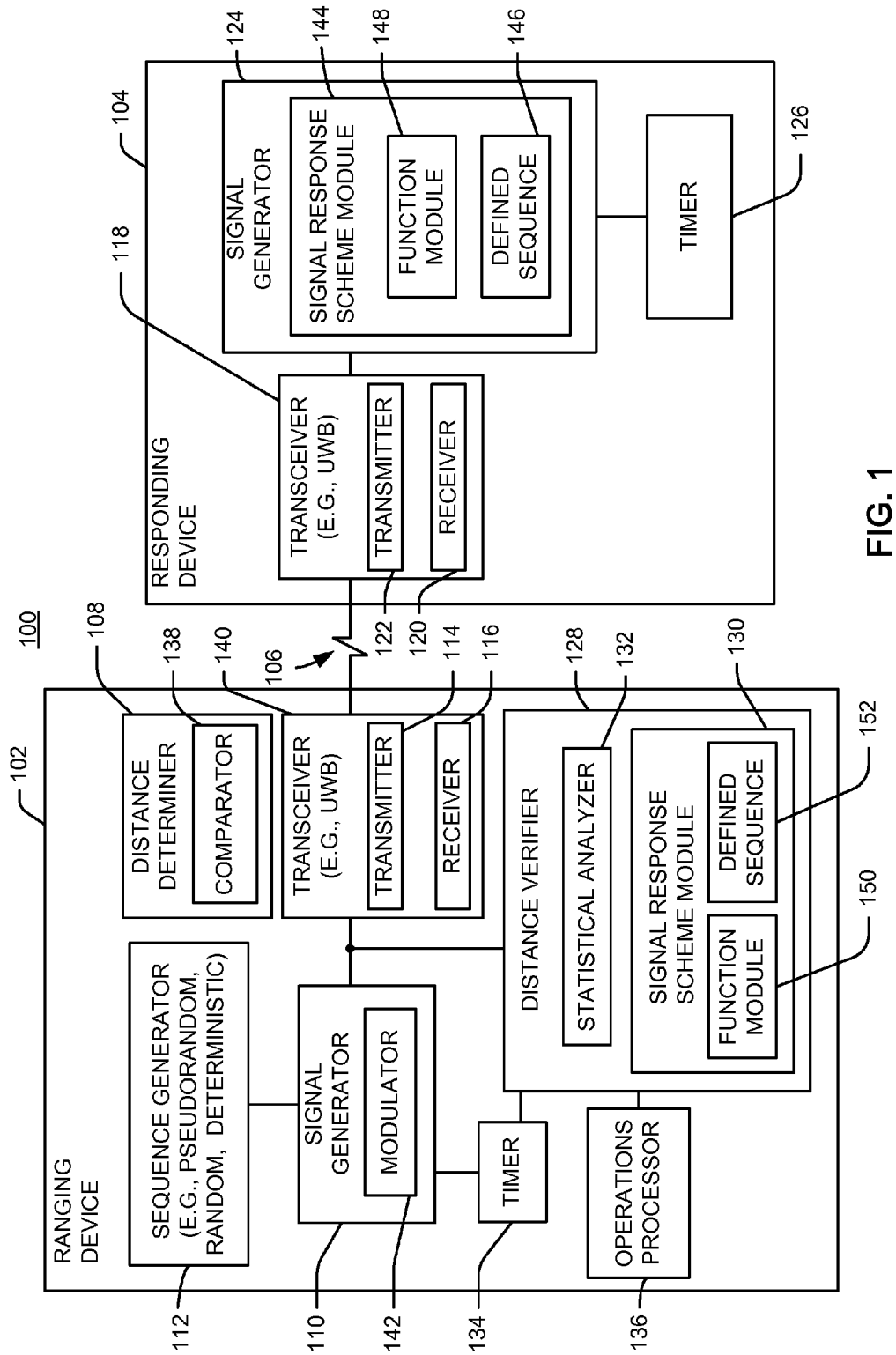
FIG. 1 is a simplified block diagram of several sample aspects of a communication system adapted to provide verified ranging.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, some aspects may involve verifying a determined distance based on characteristics of a plurality of signals while other aspects may involve verifying a determined distance based on characteristics of a plurality of signals and determining whether at least one signal is received within a defined period of time.

FIG. 1 illustrates certain aspects of a communication system 100 including a device 102 and a device 104 that perform various operations relating to verifying a distance between the devices 102 and 104. In some aspects verifying a distance relates to processing signals to determine whether characteristics of those signals serves to verify a given distance relationship between the devices 102 and 104. In some aspects verifying a distance relates to determining a distance between the devices 102 and 104 and verifying that determined distance. As illustrated in FIG. 1, the devices 102 and 104 may communicate with one another via a wireless communication link 106.

The devices 102 and 104 in the example of FIG. 1 are depicted in a simplified manner to emphasize certain components that may provide functionality relating to distance determination and associated processing. For example, the device 102 may comprise a device that performs ranging operations while the device 104 may comprise a device that responds to ranging-related operations. Thus, the device 102 is depicted to emphasize components that may be employed in a device that ultimately determines one or more distances between the devices 102 and 104 and performs one or more operations based on that determination. Conversely, the device 104 is depicted to emphasize components that may be employed in a device that may perform operations in conjunction with the distance determining operations of the device 102. It should be appreciated that a given device may incorporate the functionality depicted for device 102, the functionality depicted for device 104, or some combination thereof, as well as other functionality.

Sample operations of the system 100 will be described in more detail in conjunction with the flowchart of FIG. 2. For convenience, the operations of FIG. 2 (or any other operations discussed herein) may be described as being performed by specific components (e.g., devices 102 and 104). It should be appreciated, however, that these operations may be performed by other components and may be performed using a different number of components. It also should be appreciated that one or more of the operations described herein may not be employed in a given implementation.

Figure 2:
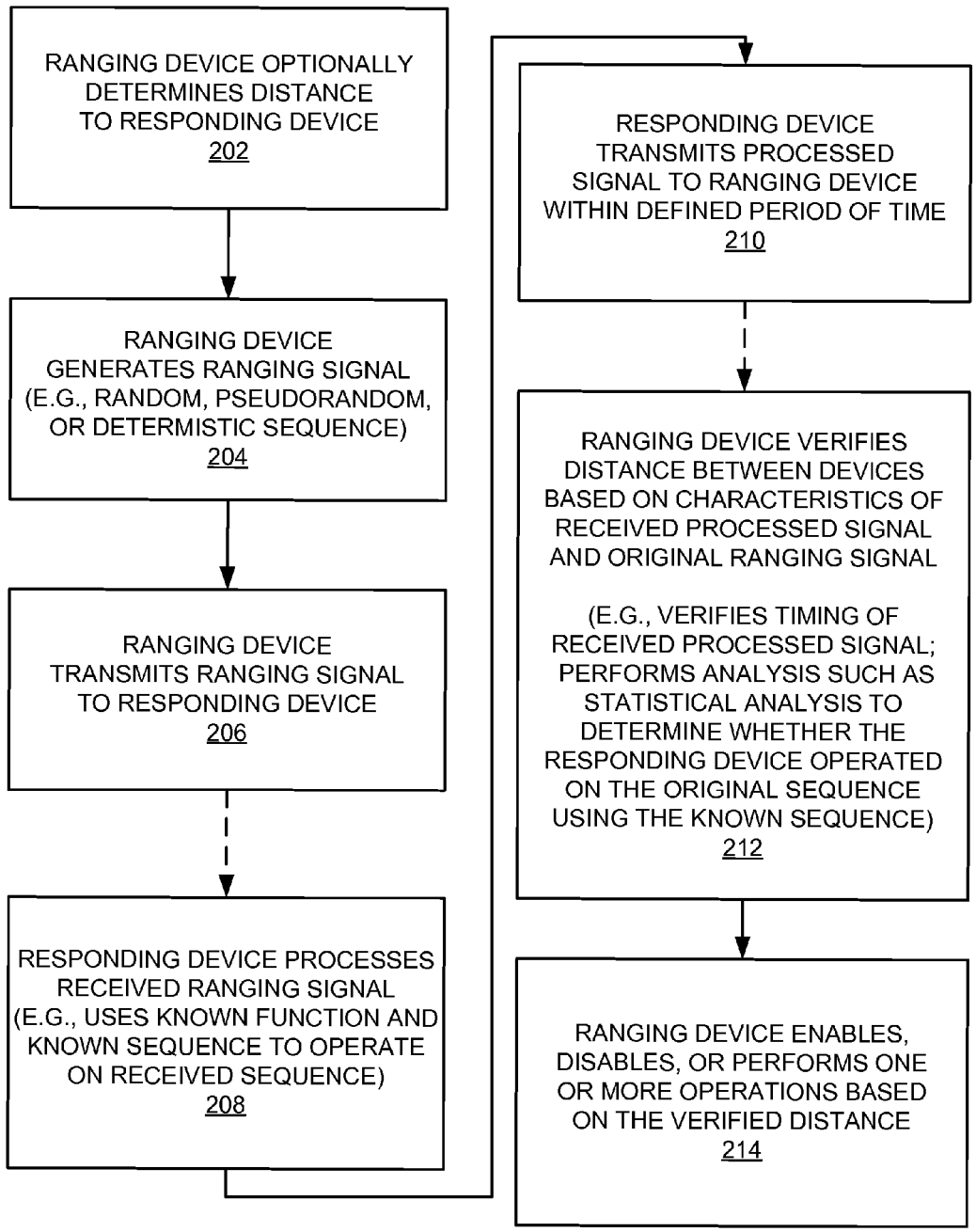
FIG. 2 is a flowchart of several sample aspects of operations that may be performed to provide verified ranging.

As represented by block 202 in FIG. 2, a ranging device such as the device 102 may optionally determine a distance between the ranging device and a responding device such as the device 104. The distance determination operation may be performed using various ranging techniques such as, for example, a time-of-arrival scheme, a two-way message exchange ranging scheme, or some other suitable scheme.

In the example of FIG. 1 the device 102 may include a distance determiner component 108 that is adapted to perform various functions relating to determining one or more distance-related parameters such as a relative distance between the devices 102 and 104. In some implementations the distance determiner 108 may utilize or cooperate with one or more other components (e.g., a transceiver 140) to determine distance.

The ranging device may verify a distance between the devices 102 and 104 in an attempt to determine whether the distance between two devices is valid or is within an allowable range. In some aspects this may involve verifying a determined distance (e.g., ensuring that a determined distance is accurate). Here, the ranging device may perform appropriate operations to ensure that the responding device or some other device has not compromised the ranging operation of the ranging device.

In some aspects the ranging device may verify a distance by causing the responding device to take some action that generates a result that is achievable only if the responding device is at most a given distance from the ranging device. An example of such an operation involves a two-way message exchange operation where verification of the distance is predicated upon the responding device transmitting a responsive signal within a defined period of time after it receives an appropriate signal from the ranging device.

Figure 3:
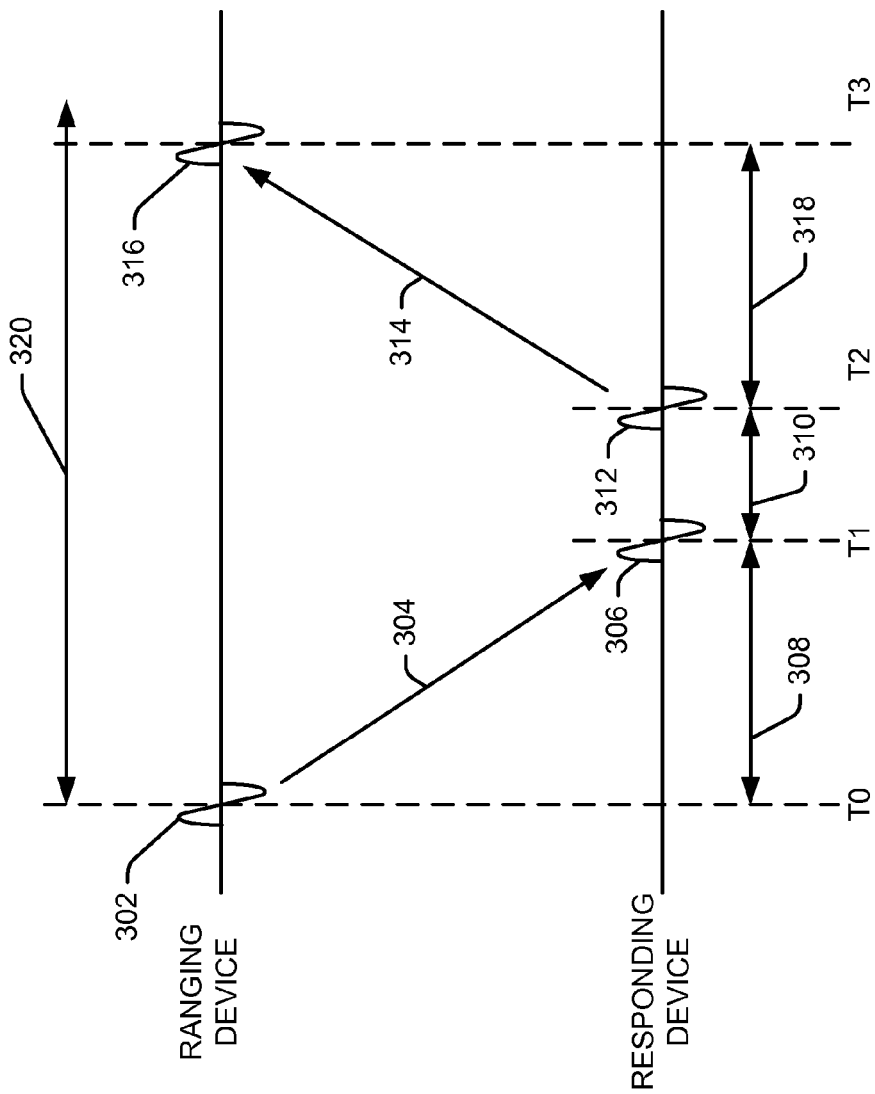
FIG. 3 is a simplified diagram illustrating a sample aspect of signal transmission and processing.

FIG. 3 illustrates, in a simplified manner, a sample two-way message exchange operation. At time T0, a ranging device transmits a signal 302 to a responding device as represented by a line 304. The signal arrives at the responding device at time T1 as represented by the signal 306. Thus, the propagation time of the signal transmitted from the ranging device to the responding device is represented by a time interval 308.

Between time T1 and time T2 the responding device processes the received signal 306. This processing time is thus represented by a time interval 310.

At time T2, the responding device transmits a processed signal 312 to the ranging device as represented by a line 314. This signal arrives at the ranging device at time T3 as represented by the signal 316. Thus the propagation time of the signal transmitted from the responding device to the ranging device is represented by a time interval 318.

The total time between transmission of the pulse 302 and reception of the pulse 316 is represented by a time period 320. As will be discussed in more detail below, the ranging device may verify a distance based on a round-trip time as represented by time period 320 and knowledge of a defined time period associated with the time period 310, where the defined time period is appropriately restricted. It should be appreciated that the time periods discussed above (e.g., round-trip time) may be defined in various ways. For example, a start time of a given time period may be defined by a time (e.g., a beginning time, a middle time, an ending time, or a zero-crossing time, etc.) associated with a pulse, a symbol, a message, or some other type of signal, or the start time may be defined in some other suitable manner. Similarly, an end time of a given time period may be defined by a time (e.g., a beginning time, a middle time, an ending time, or a zero-crossing time, etc.) associated with a pulse, a symbol, a message, or some other type of signal, or the end time may be defined in some other suitable manner.

Referring again to FIG. 2, as represented by block 204 the ranging device generates a ranging signal in conjunction with the verification of the distance between the device 102 and 104. In the example of FIG. 1, such a signal may initially be generated by a signal generator 110. In some aspects the ranging signal may be based on a random, pseudorandom, or deterministic sequence. Accordingly, the device 102 also may include a sequence generator 112. Here, it should be appreciated that the use of a sequence that is not known to the responding device beforehand may make it more difficult for the responding device to spoof its distance from the ranging device.

As represented by block 206, the ranging device transmits the ranging signal to the responding device. To this end, the transceiver (e.g., an ultra-wideband transceiver) 140 includes a transmitter component 114 and a receiver component 116. Similarly, the device 104 includes a transceiver 118 having a receiver component 120 and a transmitter component 122.

As represented by block 208, the responding device processes the ranging signal that was received from the ranging device. For example, the responding device may utilize a function known to both devices to operate on the received signal. In some implementations this may involve scrambling the received information so that the responsive signal to be transmitted by the second device is distinguishable from a reflection of the original ranging signal. In some aspects the known function may utilize or otherwise operate on a known sequence or some other information. This information may be generated in various ways including, for example, a random, pseudorandom, or deterministic manner.

In some implementations the information is generated based on cryptographic keys possessed by the ranging and responding devices. For example, the devices may exchange the keys during a pairing process involving a Diffie-Hellman key exchange or some other suitable procedure. Through the use of a sequence generated from such a key or keys, the distance-based verification operations described herein also may provide a mechanism for authenticating any key that was exchanged with the same device for which the distance is being verified.

Referring again to FIG. 1, the device 104 may include a signal generator 124 that processes the received ranging signal to generate a responsive signal. As discussed above, the responding device may perform the operations of block 208 within a defined period of time before transmitting the processed signal to the ranging device at block 210. Accordingly, the device 104 may include a timer component 126 that may facilitate or enforce such a timing restriction.

Figure 4:
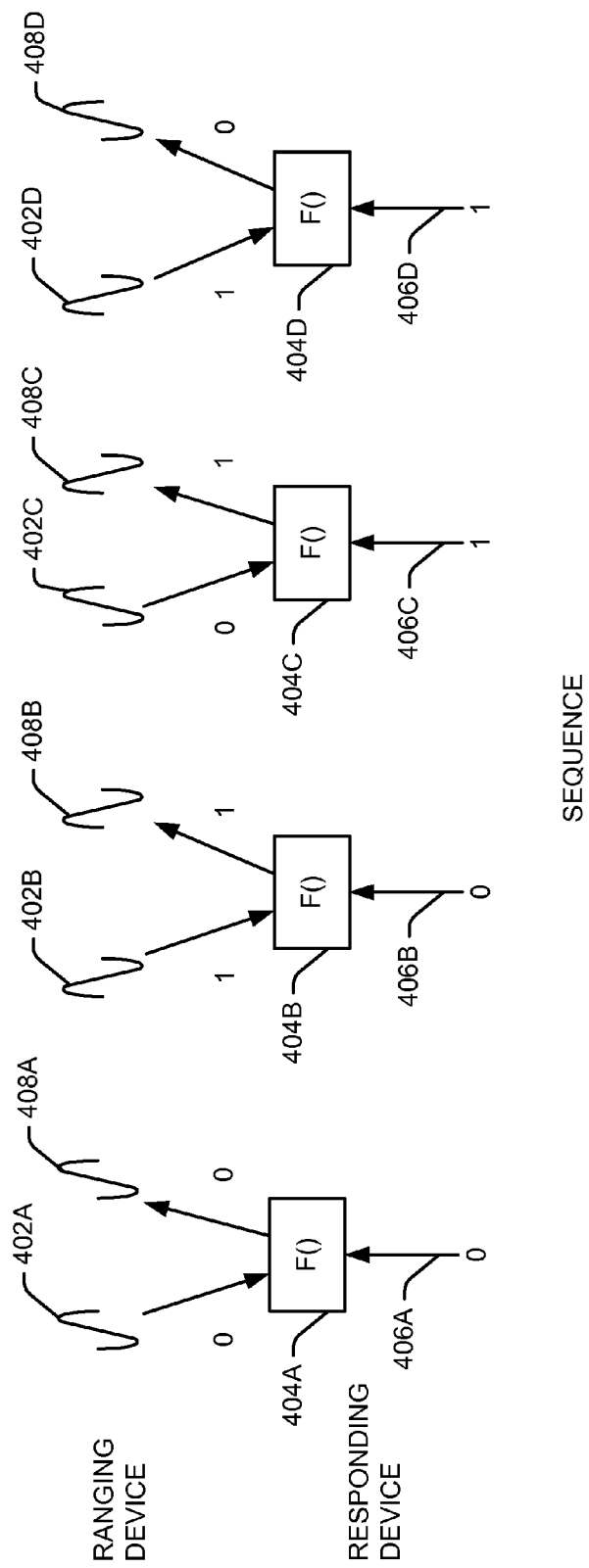
FIG. 4 is a simplified diagram illustrating a sample aspect of a function operating on signals.

FIG. 4 illustrates, in a simplified manner, a sample function and a sample sequence that may be applied to a received sequence signal. In this example the ranging device transmits a first signal 402A of a sequence to the responding device. The signal 402A is associated with a value of zero. A function component 404A of the responding device implements a known function to operate on the signal 402A in conjunction with a first value 406A of a sequence known to the ranging and responding devices. The function component 404A generates an output (having a value of zero in this example) based on the signal 402A and the value 406A. The responding device then generates a signal corresponding to the output of the function component 404A and transmits the signal to the ranging device as represented by the pulse 408A.

In this example, the function 404A comprises an XOR function. It should be appreciated, however, that a variety of other types of functions may be employed in accordance with the teachings herein. For example, a time varying function may be used, whereby the result of the function is a function of time and the values of the input or inputs.

The above operations may then be repeated for subsequent signals 402B, 402C, and 402D of the sequence from the ranging device and subsequent values 406B, 406C, and 406D of the known sequence. For convenience, FIG. 4 illustrates the subsequent operations as being performed by function components 404B, 404C, and 404D. It should be appreciated, however, that in some implementations these operations may be performed by a common function component.

Referring again to the operations of FIG. 2, as represented by block 210 the responding device transmits an appropriately processed responsive signal to the ranging device. As will be discussed in more detail below, the responding device transmits the responsive signal within a defined time period after it receives the ranging signal (e.g., a defined turnaround time). In the example of FIG. 1, this transmission may be accomplished via the transmitter component 122 of the device 104 and the receiver component 116 of the device 102.

As represented by block 212, the ranging device may verify the distance between the devices 102 and 104 based on the characteristics of the received processed signal and the ranging signal. For example, the ranging device may determine whether the received processed signal was received within a defined period of time after the transmission of the ranging signal at block 206 (e.g., a total round-trip time). In addition, the ranging device may perform a statistical analysis or some other suitable operation to determine whether the responding device operated on the ranging signal using the known sequence. To perform these and other related operations, the device 102 in FIG. 1 may include a distance verifier 128 including a signal response scheme module 130, a statistical analyzer 132, as well as other components such as the timer component 134.

In some aspects verifying a distance between the devices 102 and 104 may involve determining whether the distance is allowable or is valid. As an example of the former scenario, the distance verifier 128 may verify that the distance is within a defined range that is deemed acceptable for the performance of an associated operation or operations. As an example of the latter scenario, the distance verifier 128 may determine whether the information that is being used to verify the distance has been compromised in some way or is unreliable for some other reason.

In some aspects verifying a distance between the devices 102 and 104 may involve processing the received processed signal to obtain information relating to this distance. For example, the distance verifier 128 may determine whether the processed signal was received by the device 102 within a defined time interval after transmission of the ranging signal at block 206. Here, given that the propagation times of the signals are effectively known, and making an assumption about the turnaround time of the device 104, this round-trip timing may be used to verify that the devices 102 and 104 are within a given range. Alternatively, the distance verifier may use the round-trip time information to calculate an estimate (e.g., taking the turnaround time into account) of the actual distance between the device 102 and 104.

In some aspects verifying a distance between the devices 102 and 104 may involve verifying the accuracy of a previously determined distance. Here, the distance between the devices 102 and 104 may be determined in some manner (e.g., as discussed above in conjunction with block 202). The operations of block 212 may then be used to verify this distance. For example, the operations of block 212 may be used to determine an upper bound within which the determined distance must fall for a proper verification. In other words, the determined distance is verified if the determined distance falls below that upper bound.

As represented by block 214, in the event the ranging device verifies that the distance between two devices is valid or is within an allowable range (e.g., that a determined distance is accurate), the ranging device may take one or more actions based on the verified distance. For example, one or more operations may be enabled (e.g., invoked), disabled (e.g., terminated), or performed (e.g., modified in functionality) based on the distance. To this end, the device 102 of FIG. 1 may include an operations processor component 136 that is adapted to perform one or more operations based on, for example, whether the responding device is within a given range of the ranging device. If this condition is met, the ranging device may perform various tasks including, for example, authenticating the responding device to the ranging device or performing one or more operations to enable the responding device to access certain services provided by the ranging device. Such services may include, for example, connection to a network, access to a pay-per-view service, a financial transaction, and access to multimedia. Here, multimedia may include, for example, at least one of the group consisting of data, audio, video, and imagery.

It should be appreciated that the operations of FIG. 2 are but a sample of operations that may be performed in accordance with the teachings herein. For example, a ranging device may utilize a variety of techniques to perform the distance determining operations. In addition, various techniques may be employed to verify one or more distances. Also, a ranging device may employ various forms of signaling. For example, different types of modulation schemes may be employed in the event the signals are to be modulated. In addition, the signaling may represent different types of information. With respect to the operations of the responding device, various types of known functions may be employed to operate on received signaling and such functions may be adapted to utilize known sequences or other information taking a variety of forms. Furthermore, the ranging device may utilize a variety of techniques for verifying that a proper signal was received from the responding device.

Figure 5:
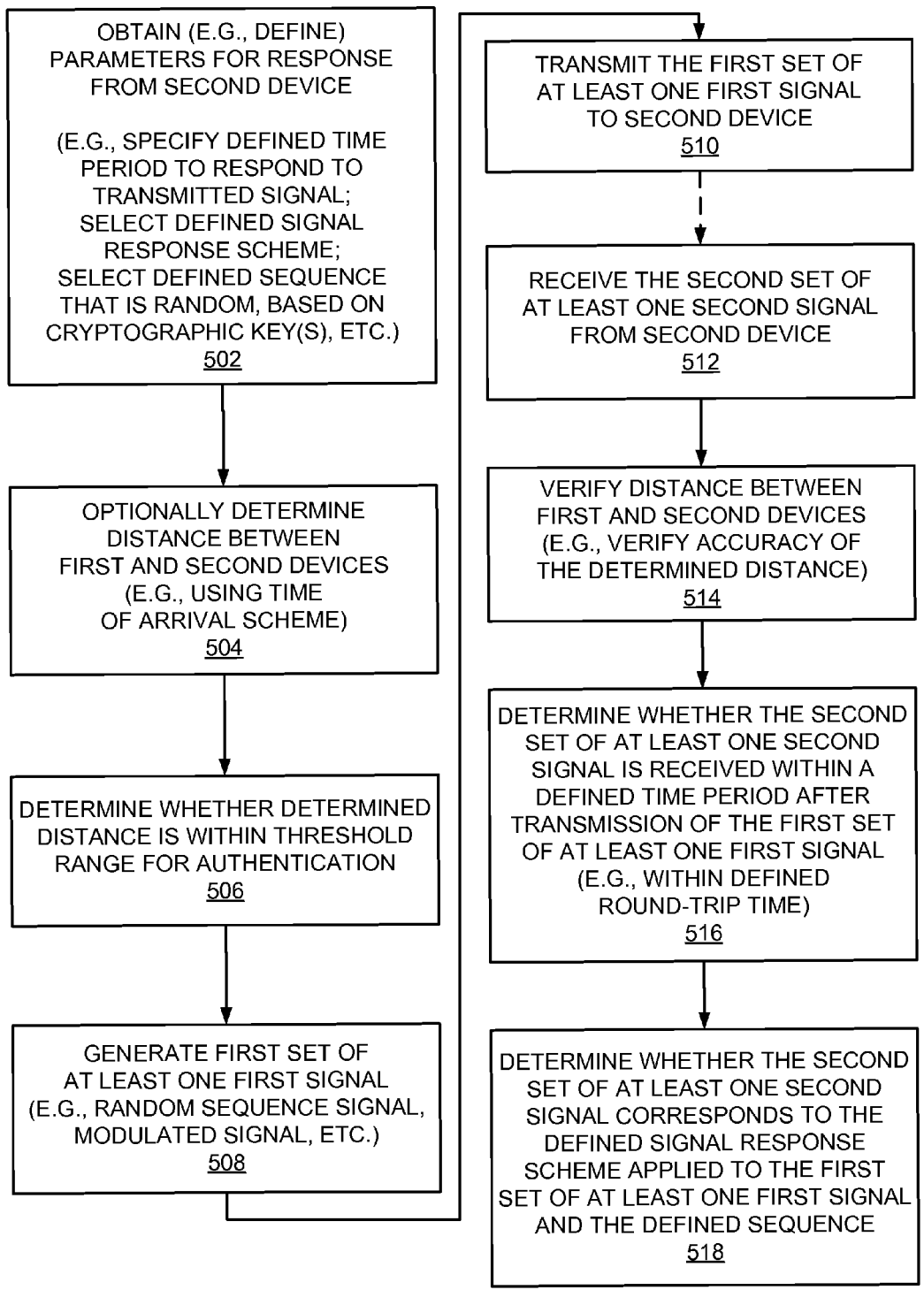
FIG. 5 is a flowchart of several sample aspects of operations that may be performed in conjunction with verified ranging.
Figure 6:
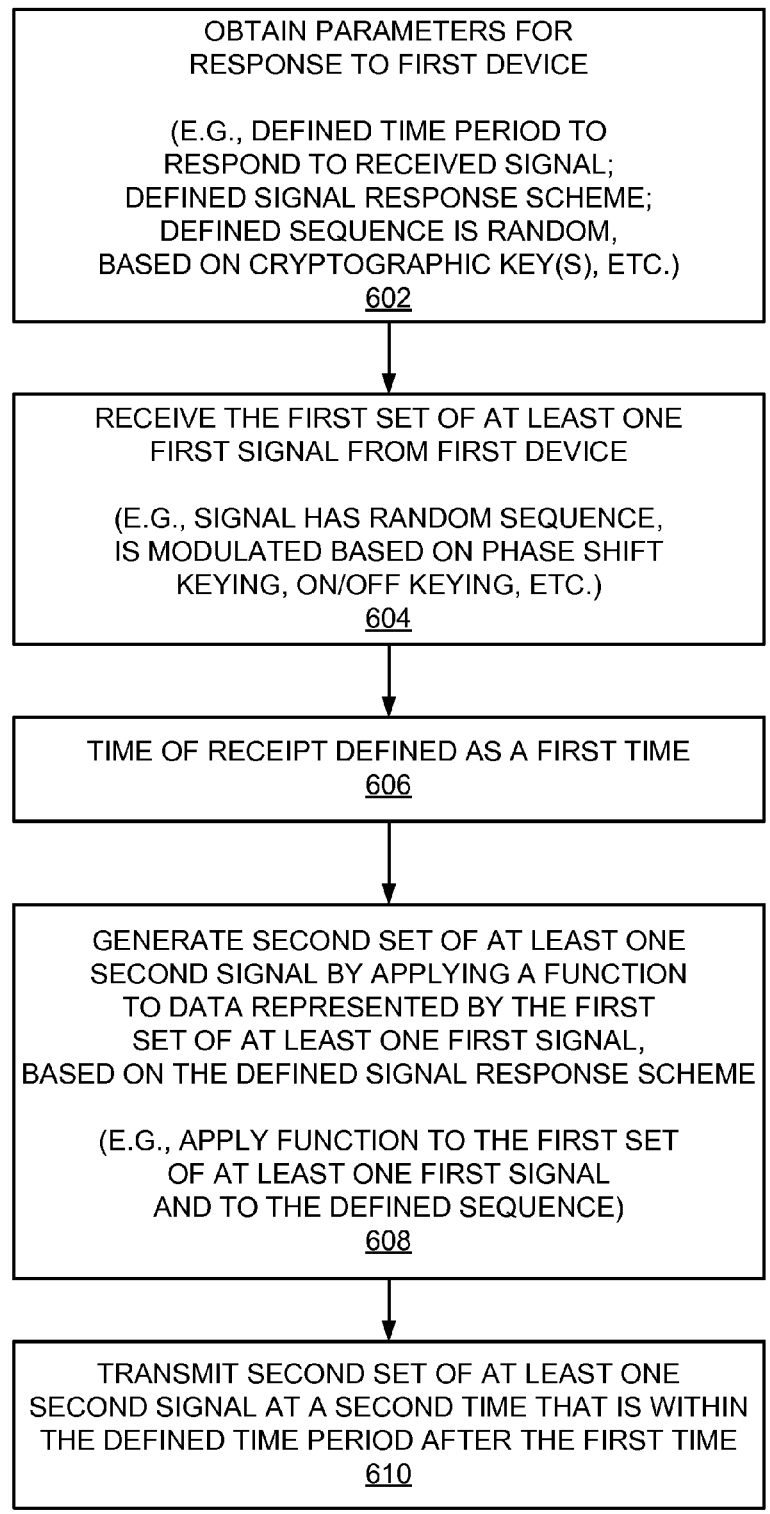
FIG. 6 is a flowchart of several sample aspects of operations that may be performed in conjunction with verified ranging.

Additional details of an example of a distance verification operation that employs a two-way message exchange scheme will be discussed in conjunction with the flowcharts of FIGS. 5 and 6. FIG. 5 relates to operations that may be performed, for example, by a first device such as the device 102. FIG. 6 relates to operations that may be performed, for example, by a second device such as the device 104. As noted above, it should be appreciated that the examples of FIGS. 5 and 6 are provided for illustration purposes and that the teachings herein may be employed in other types of systems utilizing different combinations of components and operations.

In some aspects a distance verification operation may employ one or more defined parameters. For example, a turnaround time may be defined relating to a maximum amount of time within which the second device (e.g., a responding device) should respond to a signal that was received from the first device (e.g., a ranging device). Through the use of such a timing scheme, the first device may be effectively protected from any attempt by the second device or some other device to compromise a distance determination operation that is based on a message exchange between the first and second devices. For example, the first device may calculate a round-trip time or a one-way-trip time between the first and second devices by transmitting a ranging signal to the second device and having the second device transmit a responsive signal that indicates the second device's turnaround time. Here, the second device's turnaround time relates to the period of time from the time the second device received the ranging signal to the time the second device transmitted the responsive signal.

Assuming the second device reports a correct turnaround time, the first device may calculate the actual signal propagation time between the first and second devices by subtracting the turnaround time from the total round-trip time. Here, the total round-trip time may be the amount of time that elapsed from the time the first device transmitted the ranging signal to the time it received the responsive signal. However, in the event the second device does not report a correct turnaround time, any distance-related determination based on this turnaround time may be inaccurate.

As will be discussed in more detail below, through the use of a defined turnaround time for the second device a substantially accurate distance determination may be made even if the second device reports a false turnaround time. For example, the defined turnaround time may be defined to be within a range of acceptable error for a given range of measured distances. Consequently, any attempt by the second device to report a spoofed turnaround time period may have little effect on the determined distance. Moreover, the first device may reject (e.g., ignore) any reported turnaround time that exceeds the defined turnaround time. As an example, a period of time of 1 nanosecond may roughly equate to a signal propagation distance on the order of 1 foot. Hence, if the defined turnaround time is defined as 1 nanosecond, any attempt by the second device to spoof its turnaround time will cause, at most, an error on the order of 1 foot in the determined distance. Here, any reported turnaround time exceeding 1 nanosecond may be ignored by the first device. For greater security the assumed turnaround time may be defined to be zero seconds to ensure that the device being authenticated (e.g., the second device) is within a prescribed range. Here, since the actual turnaround time will be non-zero, the second device will in actuality be closer than the prescribed range.

Moreover, in the event the turnaround time provided by the second device is not trusted, the first device may simply use the total measured round-trip time and an assumed turnaround time to determine the distance between the first and second devices. In other words, the first device need not rely on any turnaround information provided by the second device. Such an implementation may employed where any error associated the use of an assumed turnaround time (as opposed to the real turnaround time) is within an acceptable range of tolerance. As an example, a period of time of 10 nanoseconds may roughly equate to a signal propagation distance on the order of 10 feet. Thus, by assuming that the turnaround time is 5 nanoseconds when the defined turnaround time period is 10 nanoseconds, the error associated with the distance measurement will be at most on the order of five feet.

In some aspects the first device may use the defined turnaround time to verify a determined distance between the devices that was provided in some other manner (e.g., by some other ranging mechanism). For example, a secondary indication of the distance between the first and second devices may be obtained by determining whether the total measured round-trip time is, within a degree of tolerance, less than or equal to the expected true round-trip time plus the defined turnaround time (or the reported turnaround time if it is trusted). Here, the expected true round-trip time corresponds to the initial determined distance between the devices (e.g., determined by some other ranging mechanism). As discussed above, some measure of error may be associated with the use of the defined turnaround time in the event the turnaround time provided by the second device is not trusted. Thus, the initial determined distance may be verified if the secondary indication of distance does not exceed the initial determined distance by some threshold amount.

Various values may be assigned to the defined periods of time discussed above. In some aspects the value of a defined period of time may relate to a range of distances associated with an expected distance between the first and second devices. For example, if the devices operate in a body area network having a range on the order of 10 meters, the total round-trip time may be on the order of a typical propagation time associated with that range (e.g., on the order of 30 nanoseconds). Similarly, if the devices operate in a personal area network having a range on the order 30 meters, the total round-trip time may be related to that range (e.g., on the order of 100 nanoseconds). It should be appreciated that other round-trip times may be defined for other networks and/or may be based on other criteria.

The turnaround time may be defined in a similar manner. For example, if the devices operate in a body area network having a range on the order or 10 meters, an acceptable turnaround time may relate to the typical propagation time associated with that range (e.g., less than 30 nanoseconds). In addition, the turnaround time may relate to some acceptable distance error within that range. For example, if the acceptable distance error is one meter (e.g., 10% error), the turnaround time may be defined to be on the order of 2 or 3 nanoseconds. Similarly, if the devices operate in a personal area network having a range on the order 30 meters, the turnaround time may be related to that range (e.g., less than 100 nanoseconds, or 10 nanoseconds). It should be appreciated that other turnaround times may be defined for other networks and/or may be based on other criteria.

In some aspects a signal response scheme may be defined whereby the signal response scheme will be used by the second device to operate on information received from the first device. For example, the signal response scheme may relate to application of a known function to received information. Information (e.g., a sequence) to be used in conjunction with the signal response scheme also may be defined. In some aspects, such information may be defined to be generated in a random, pseudorandom, deterministic manner. In some aspects the information may be defined based on one or more cryptographic keys. For example, the information may be a function of one or more cryptographic keys known to (e.g., maintained by) the first device, the second device, or both.

As will be discussed in more detail below, through the use of a known signal response scheme, the first device may verify that the second device properly operated on information received from the first device. For example, the second device could attempt to compromise the distance determining operation of the first device by transmitting a spoofed responsive signal to the first device at an earlier point in time. Here, since the spoofed responsive signal would be received earlier than a genuine responsive signal, the first device could potentially be tricked into determining that the second device is closer to the first device than it actually is.

The use of a known signal response scheme, however, may make it more difficult for the second device to spoof the responsive signal. For example, the information (e.g., a sequence) transmitted from the first device to the second device may not be known to second device. To compromise the distance determination operation, however, a second device must transmit a spoofed responsive signal at a point in time that is earlier than the point in time that the second device would transmit a genuine responsive signal. Consequently, to spoof the responsive signal, the second device would need to correctly guess the contents of the information being transmitted by the first device. Accordingly, provisions may be made to transmit information that is more difficult to spoof and provisions may be made to determine whether the second device is attempting to spoof this information. These and other operations will now be discussed in more detail in conjunction with the sample operations of FIGS. 5 and 6.

As represented by block 502 in FIG. 5 and block 602 in FIG. 6, the first and second devices may obtain the above defined parameters or other parameters in some suitable manner. In some implementations these parameters may be provided to the first device and/or the second device (e.g., by another device). In some implementations these parameters may be generated by one or more of the first and second devices. For example, the first device may define (e.g., select) the parameters and provide the parameters to the second device. In some implementations these parameters may be programmed into the first and second devices in a relatively static manner (e.g., when the first and second devices are manufactured or initially brought into service).

Referring now to the operations of FIG. 5, at block 504 the distance between the first and second devices may optionally be determined using an appropriate ranging scheme as discussed above. Various techniques may be employed to measure distance including, for example, time of arrival measurements, two-way ranging, two-way message exchange techniques, and received power measurements. In the example of FIG. 1, the distance determiner 108 may employ corresponding circuitry (e.g., a laser circuit, optics, a signal strength measuring circuit, RF circuitry, and associated signal processing circuitry) to measure distance using one or more of these techniques. In some implementations one or more distance determining components may be implemented in a wireless communication device (e.g., the transceiver 140). For example, an implementation that uses RF signals to determine distance may utilize the transceiver 140 to receive and/or transmit ranging-related signals (e.g., ultra-wideband pulses).

As represented by block 506, in some aspects a determination may be made as to whether the distance determined at block 504 is within an acceptable range. For example, the purpose of the distance determining operation may be to determine whether some action should be taken based on whether the second device is close enough to the first device. In this case, if the determined distance is not within an acceptable range there may be no need to verify (e.g., authenticate) the determined distance since the action in question may not be performed anyway. To this end, the distance determiner 108 of FIG. 1 may include a comparator 138 that compares the determined distance with one or more threshold values that may be maintained in the device 102 (e.g., stored in a data memory). The distance determiner 108 may thereby provide an indication as to whether the determined distance is more than a threshold distance, less than a threshold distance, equal to a threshold distance, or with one or more ranges of distances defined by two or more threshold distances. In the event the determined distance is within a desired range of values (e.g., less than a threshold, etc.), the first device may commence operations for verifying the determined distance.

As represented by block 508, the first device generates a first set of at least one first signal to be used for verifying a distance between the devices. In general, the signal set represents some form of information that may be used to verify that the second device has processed this signal set. To this end, the signal set may comprise a single signal, several signals, a group of signals, a sequence of signals, or some other combination of signals.

In some aspects the signal set may be defined in a manner that makes it more difficult for the second device to guess the information represented by the signal set. For example, the signal set may be generated in a deterministic manner that is not known by the second device. Alternatively, the signal set may be generated in a random or pseudorandom manner. Thus, in some aspects, the signal set may be based on or comprise a random sequence, a pseudorandom sequence, or a deterministic sequence.

In some aspects the signal set may be modulated in some manner. For example, the first device may vary one or more characteristics associated with the signal set including, for example, time, frequency, phase, and amplitude. As discussed above, these characteristics may be varied in a random manner, a pseudorandom manner, or a deterministic manner.

Various modulation schemes may be employed to provide a modulated signal set. For example, in some aspects a modulation scheme may employ phase shift keying, on/off keying, frequency shift key, or time shift keying. Thus, a given input signal (e.g., an ultra-wideband pulse stream) may be modulated using one of these schemes based on, for example, a random, pseudorandom, or deterministic sequence, or other information.

The first device includes various components to implement these and other operations associated with generating the signal set. Referring to the example of FIG. 1, the sequence generator 112 of the device 102 may be adapted to generate a random sequence, a pseudorandom sequence, or a deterministic sequence. In addition, the signal generator 110 may be adapted to initially generate the signal set. The signal generator 110 also may include a modulator 142 adapted to modulate one or more signals to generate the signal set.

Referring again to FIG. 5, as represented by block 510 the first device transmits the first set of at least one first signal (i.e., the first signal set) to the second device. In the example of FIG. 1, the transmitter 114 transmits the first signal set over the wireless link 106. In some aspects, the first device keeps track of the amount of time that elapses between the transmission of the first set of least one first signal and reception of a responsive signal from the second device (e.g., total signal round-trip time). In the example of FIG. 1, the timer component 134 may be adapted to commence a timing operation upon transmission of the first signal set.

Referring now to the sample operations of the second device represented by FIG. 6, at block 604 the second device receives the first set of at least one first signal (i.e., the first signal set) from the first device. In the example of FIG. 1, the first signal set is received via the receiver 120. As discussed above, the received signal may be modulated and may relate to a sequence or some other type of information.

In some aspects the second device may be required to transmit a responsive signal within a defined turnaround time period after receipt of the first signal set. For example, in the event the second device does not transmit a responsive signal within the defined turnaround time, the first device may terminate or ignore the results of any distance determining-related operations associated with the responsive signal. Accordingly, the second device may be configured to perform its functions in a manner that attempts to ensure that the defined turnaround time period is met. For example, other operations (e.g., transmissions) of the second device may be suspended until the responsive signal is sent. To this end, as represented by block 606 the second device may define the time of receipt of the signal set at block 604 as a first time. For example, receipt of a specified signal from the first signal set may be defined as a first time (e.g., first point in time). The second device may then use this first time to determine a second time when the responsive signal needs to be transmitted. For example, transmission of a specified signal from a second signal set may be defined as a second time (e.g., second point in time). In the example of FIG. 1 the timer component 126 may provide functionality relating to these and any other timing operations.

As represented by block 608, the second device generates the responsive signal in the form of a second set of at least one second signal. This second signal set may comprise a single signal, several signals, a group of signals, a sequence of signals, or some other combination of signals. In the example of FIG. 1, the second signal set is generated by the signal generator 124.

In some aspects the second device generates the second signal set by applying a function to data represented by the first signal set in accordance with a signal response scheme that is known to the first and second devices. For example, the second device 104 in FIG. 1 may process (e.g., demodulate) the first signal set to derive the information (e.g., sequence) generated by the first device 102. The signal generator 124 may then operate on the derived information to generate the second signal set based on the signal response scheme. As will be discussed in more detail below, the use of a known function to generate the second signal set provides a mechanism for the first device to, upon analysis of the second signal set, verify that the second device operated on the first signal set.

The signal response scheme and associated function may take any suitable form to accomplish these and other similar objectives. For example, in some aspects the function involves altering (e.g., determining) whether or not a signal (e.g., a pulse) is to be transmitted. In some aspects the function involves altering a phase of a signal in a known manner. In the example of FIG. 1, a signal response scheme module 144 may provide functionality for processing the first signal set to generate the second signal set.

In some aspects a signal response scheme may involve operating on information in addition to the first signal set.

Such information may include, for example, a defined sequence, a known set of phase adjustments, or some other suitable information that is known to the first and second devices. This information (e.g., a defined sequence 146) may be stored in a data memory.

In some aspects the signal response scheme module 144 may comprise a function module 148 adapted to operate on the first signal set (e.g., on data represented by the first signal set) and the information that is known to the first and second devices to generate the second signal set. In some aspects the function provided by the function module 148 may comprise an XOR operation (e.g., as described in conjunction with FIG. 4). It should be appreciated, however, that the function module 148 may implement other types of functions.

As represented by block 610, the second device transmits the second signal set to the first device. For example, the signal generator 124 may generate a signal set (e.g., one or more signals) that is modulated according to the results of the signal response scheme. The transmitter 122 then transmits the modulated signal set over the communication link 106.

As discussed above the second device may transmit the second signal set at a second time that is within a defined time period after the first time (e.g., within the defined turnaround time). As an example, if the defined time period is 10 microseconds, the second time may be any point in time after the first time up to, but not exceeding, 10 microseconds after the first time. Thus, the second device may transmit the second signal 2 nanoseconds after the first time, 10 nanoseconds after the first time, 1 microsecond after the first time, and so on.

Referring again to FIG. 5, the first device receives the second signal set at block 512. In the example of FIG. 1, the second signal set may be received at the receiver 116 via the communication link 106.

As represented by block 514, the first device (e.g., the distance verifier 128 of FIG. 1) verifies the distance between the devices based on characteristics of the first signal set and the second signal set. Here, verifying the distance may involve a variety of operations. For example, verification may relate to verifying the actual distance, verifying that the distance is within a given range of potential distance values, verifying whether the distance is consistent with another distance-related indication, or verifying other aspects relating to one or more distance determining operations. In some aspects verifying a distance relates to processing signals to generate an indication relating to the distance between the first and second devices, and using the indication to corroborate (e.g., verify the accuracy of) a determined distance. In some aspects this operation relates to processing received signals (e.g., received in conjunction with a distance determining-related operation) in an attempt to verify that the received signals were properly processed by the second device, as opposed to being the result of an attempt by the second device to spoof its distance from the first device. Various aspects of such determined distance verification operations will be discussed in conjunction with blocks 516 and 518.

As represented by block 516, the second device determines whether the second signal set is received with a defined time period after transmission of the first signal set. In the example of FIG. 1, the distance verifier 128 may cooperate with the timer 134 to determine the amount of time that elapsed between the transmission of the first signal set and the reception of the second signal set (e.g., the measured total round-trip time).

In some aspects the defined time period of block 516 may comprise a time period associated with a maximum acceptable distance between the first and second devices. Here, if the measured total round-trip time exceeds the defined time period, the second device may be deemed to be too far away from the first device. In contrast, if the measured total round-trip time is within the defined time period, the first and second devices may be deemed to be with an acceptable range of one another.

Alternatively, in some aspects the defined time period at block 516 may be associated with a previously determined distance. For example, the defined time period may be a period of time that was expected for the total round-trip time in view of the previously determined distance. In this case, if the measured total round-trip time exceeds the defined time period (e.g., including some range of tolerance), the first device may determine that the distance (e.g., a previously determined distance) is not verified. In contrast, in the event the measured total round-trip time is within (less than or equal to) the defined time period, the first device may determine that the distance is verified.

Based on the above determination(s), any of the operations that were to be performed based on an acceptable distance between the first and second devices may be impacted in an appropriate manner. For example, an operation may be or may not be invoked, an operation may be or may not be terminated, or an operation may be impacted in some other manner.

As represented by block 518, the first device may determine whether the second signal set corresponds to an expected result of a defined signal response scheme being applied to the first signal set, and optionally to a defined sequence. To this end, the device 102 of FIG. 1 may include a signal response scheme module 130 that may perform operations similar to the signal response scheme module 144 of device 104. In some aspects, the operations of block 518 relate to verifying that the second device operated on the first signal set at block 608 discussed above. To this end, the first device (e.g., a function module 150) may apply the known function to the first signal set and known information such as a defined sequence 152 (e.g., stored in a data memory). The signal response scheme module 130 may then compare the results of this operation with the second signal set. Based on the results of this comparison, a determination may be made as to whether the second device has performed the proper operation or whether the second device has spoofed (e.g., attempted to guess) the expected result in an attempt to compromise the distance determining operation of the first device.

In addition, given that the signal sets may be transmitted through a relatively noisy or lossy communication medium (e.g., link 106), provisions may be made to analyze the received second signal set in a manner that accounts for potential errors in the received signal caused by the communication medium. For example, the second device may transmit a sequence (e.g., based on a sequence from the first device) that is long enough to enable the first device to properly analyze the received sequence even if there are errors in the received sequence.

In some aspects the first device may analyze the received information to determine whether the second device actually operated on information sent by the first device or randomly guessed the information sent by the first device. For example, this process may involve performing a statistical hypothesis test between the expected result of the function and information actually received from the second device (e.g., data derived from the second signal set). The first device may then generate a confidence interval relating to the probability as to whether the second device actually processed the information or made a guess.

In some aspects the first device may employ statistical analysis (e.g. via the statistical analyzer 132) to determine whether the received information is statistically correct. This process may involve, for example, deciding between a hypothesis that the second device actually operated on information sent by the first device and a hypothesis that the second device randomly guessed the information sent by the first device. For example, the statistical analyzer 132 may generate binomial sequences relating to these hypotheses and compare the hypotheses to one or more thresholds. In some implementations the statistical analyzer 132 employs a statistical test between a random Bernoulli(0.5) process and a random process with probability less that 0.5 based on the error rates of the channel (e.g., the wireless communication link). Through the use of these or other techniques, the statistical analyzer 132 may make a determination as to whether the number of correctly received bits is greater than a threshold.

The first device will then take appropriate action based on the results of the verification of the second signal set. For example, if it is determined that the second device guessed, the current distance determining operation may be aborted and a new distance determination operation commenced. Moreover, as discussed above, one or more distance-based operations (e.g. associated with the operations processor 136) may be or may not be invoked, may be or may not be terminated, or may be impacted in some other manner depending upon the results the verification.

With the above in mind, a sample ranging verification operation that may be employed in a system such as an impulse-based system (e.g., an ultra-wideband system) will be briefly treated. In essence, this operation involves a first node performing a traditional ranging procedure with a second node to determine a distance D between the two devices. The first node then verifies the distance to the second node by requiring that the second node perform actions that could only be done if the second node is at most a distance D from the first node. Initially, at a given interval (e.g., X nanoseconds), the first node randomly determines whether to transmit a pulse over a given communication medium. Concurrently, the second node scans the communication medium to determine whether it has received a pulse from the first node. In the event the second node has received a pulse, the second node transmits a pulse to the first node within a defined period of time (e.g., T nanoseconds). In the event the second node had not received a pulse, the second device does not transmit a pulse to the first node. In some implementations the second node may scramble the received pulses according to a pseudorandom sequence or based on some other criteria. For example, depending on the current value of the sequence, the second node may or may not transmit a pulse in response to a received pulse, or the second node may or may not transmit a pulse when it does not receive a pulse.

The first node also scans the channel to determine whether it has received any pulses from the second node. If so, the first node measures the delay between the time at which the first node transmitted a pulse and the time at which the first node received the pulse from the second node. In addition, the first node measures a correlation between the pulses it transmitted and the pulses it received. The first node may then generate a conservative estimate of the distance between the two nodes by taking the measured delay and multiplying that by the speed of light. The first device then compares the correlation to a confidence interval in an attempt to determine whether the second node actually processed the pattern that the first node transmitted or whether the second node attempted to randomly guess the pattern. In some aspects, the number agreement, to a first-order, may be substantially higher than 50%. In the event the correlation check passes, the first node may verify that the second node is within distance D of the first node.

The teachings herein may be incorporated into (e.g., implemented within or performed by) various types of devices. For example, one or more aspects taught herein may be incorporated into a phone (e.g., a cellular phone), a personal data assistant ("PDA"), an entertainment device (e.g., a music or video device), a headset (e.g., headphones, an earpiece, etc), a microphone, a medical device (e.g., a biometric sensor, a heart rate monitor, a pedometer, an EKG device, etc.), a user I/O device (e.g., a watch, a remote control, a switch, a keyboard, a mouse, etc.), a tire pressure monitor, an entertainment device, a point-of-sale device, a computer, a point-of-sale device, a hearing aid, a set-top box, or some other suitable device with wireless signaling capabilities. Moreover, these devices may have different power and data requirements. In some aspects, the teachings herein may be adapted for use in low power applications (e.g., through the use of a pulse-based signaling scheme and low duty cycle modes) and may support a variety of data rates including relatively high data rates (e.g., through the use of high-bandwidth pulses).

The devices 102 and 104 described herein or other suitable devices may support or otherwise use various wireless communication links and wireless network topologies. For example, in some aspects the devices 102 and 104 may comprise or form part of a body area network or a personal area network. In addition, in some aspects the devices 102 and 104 may comprise or form part of a local area network or a wide area network. The devices 102 and 104 also may support or otherwise use one or more of a variety of wireless communication protocols or standards including, for example, CDMA, WiMAX, Wi-Fi, and other wireless technologies. Accordingly, the devices 102 and 104 may include appropriate components (e.g., air interfaces) to establish one or more communication links using various wireless technologies.

Any of the devices 102 and 104 may include various components that perform functions bases on signals transmitted or received via the wireless communication link. For example, a headset may include a transducer adapted to provide an audible output based on a signal received via a receiver. A watch may include a display adapted to provide a visual output based on a signal received via a receiver. A medical device may include a sensor adapted to generate sensed data to be transmitted via a transmitter.

In some aspects the devices 102 and 104 or other suitable devices may communicate via or form an ultra-wideband network. For example, communication may be achieved through the use of ultra-wideband pulses that have a relatively short length (e.g., on the order of a few nanoseconds in some implementations) and a relatively wide bandwidth. Ultra-wideband signaling may be particularly well suited for ranging operations in implementations that employ relatively narrow pulses. In some aspects each ultra-wideband pulse may have a fractional bandwidth on the order of approximately 20% or more and/or a bandwidth on the order of approximately 500 MHz or more. The ultra-wideband network may take various forms including, for example, a body area network or a personal area network.

Figure 7:
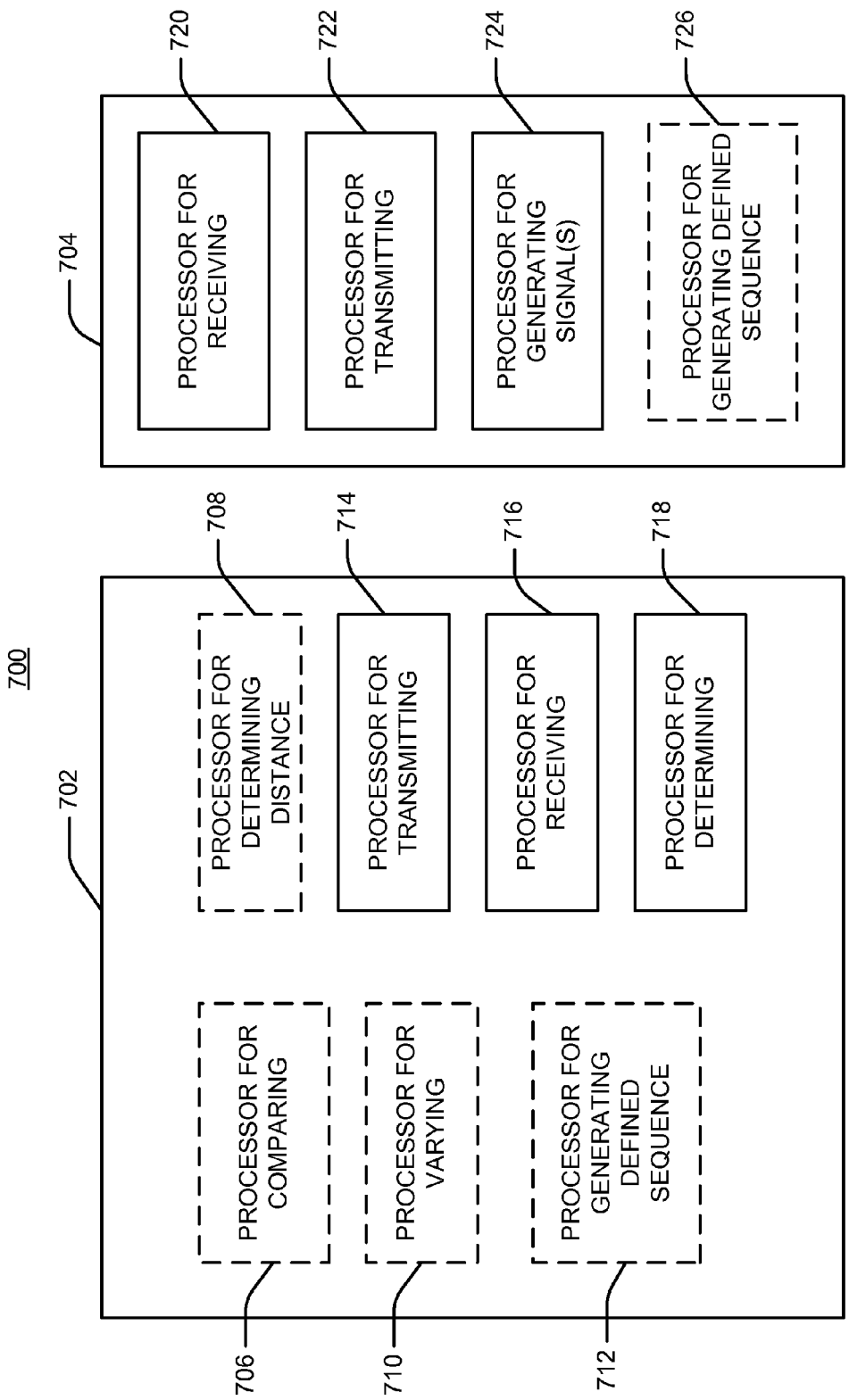
FIG. 7 is a simplified block diagram of several sample aspects of a communication system adapted to provide verified ranging.

The components described herein may be implemented in a variety of ways. Referring to FIG. 7, in a system 700 incorporating an apparatus 702 and an apparatus 704, each apparatus is represented as a series of interrelated functional blocks that may represent functions implemented by, for example a processor, software, some combination thereof, or implemented in some other manner as taught herein. As shown in FIG. 7, the apparatus 702 may include one or more modules 706, 708, 710, 712, 714, 716, and 718 that may perform one or more of the functions described above with regard to various figures. In addition, the apparatus 704 may include one or more modules 720, 722, 724, and 726 that may perform one or more of the functions described above with regard to various figures. For example, a processor for comparing 706 may provide comparison-related functionality as taught herein and may correspond to, for example, component 138 discussed above. A processor for determining distance 708 may provide distance determining-related functionality as taught herein and may correspond to, for example, component 108 discussed above. A processor for varying 710 may provide signal generation and processing-related functionality as taught herein and may correspond to, for example, component 110 discussed above. A processor for generating defined sequence 712 may provide sequence generation-related functionality as taught herein and may correspond to, for example, component 112 discussed above. A processor for transmitting 714 may provide various functionality relating to transmitting information to another device as taught herein and may correspond to, for example, component 114 discussed above. A processor for receiving 716 may provide various functionality relating to receiving information from another device as taught herein and may correspond to, for example, component 116 discussed above. A processor for determining 718 may provide distance and/or signal verification-related functionality as taught herein and may correspond to, for example, component 128 discussed above. A processor for receiving 720 may provide various functionality relating to receiving information from another device as taught herein and may correspond to, for example, component 120 discussed above. A processor for transmitting 722 may provide various functionality relating to transmitting information to another device as taught herein and may correspond to, for example, component 122 discussed above. A processor for generating signal(s) 724 may provide signal generating-related functionality as taught herein and may correspond to, for example, component 124 discussed above. A processor for generating defined sequence 726 may provide sequence generation-related functionality as taught herein and may correspond to, for example, component 124 discussed above.

As noted above, FIG. 7 illustrates that in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

In some aspects the apparatus 702 or the apparatus 704 may comprise an integrated circuit. Thus, the integrated circuit may comprise one or more processors that provide the functionality of the processor components illustrated in FIG. 7. For example, in some aspects a single processor may implement the functionality of the illustrated processor components, while in other aspects more than one processor may implement the functionality of the illustrated processor components. In addition, in some aspects the integrated circuit may comprise other types of components that implement some or all of the functionality of the illustrated processor components.

In addition, the components and functions represented by FIG. 7, as well as other components and functions described herein, may be implemented using any suitable means. Such means also may be implemented, at least in part, using corresponding structure as taught herein. For example, in some aspects means for comparing may comprise a comparator, means for determining distance may comprise a distance determiner, means for varying may comprise a signal generator, means for generating defined sequence may comprise a sequence generator, means for transmitting may comprise a transmitter, means for receiving may comprise a receiver, means for determining may comprise a distance verifier, means for generating signal(s) may comprise a signal generator, and means for generating defined sequence may comprise a signal generator. One or more of such means also may be implemented in accordance with one or more of the processor components of FIG. 7.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method operational in a first device for verifying a distance, comprising:
    determining the distance between the first device and a second device;
    comparing the determined distance to a threshold maximum acceptable distance to determine if the determined distance is equal to or less than the threshold maximum acceptable distance;
    transmitting, after the determination of the distance and that the determined distance is equal to or less than the threshold maximum acceptable distance, a first set of at least one first signal to the second device, the first set of at least one signal including a random sequence unknown to the second device;
    receiving a second set of at least one second signal transmitted by the second device in response to the first set of at least one first signal, the second set of at least one second signal generated by applying a function to the random sequence of the first set of at least one first signal;
    determining, based on an actual round-trip time from transmission of the first set of at least one first signal to reception of the second set of at least one second signal and an expected round-trip time for the previously determined distance, whether the previously determined distance between the first device and the second device is valid or allowable; and
    causing the second device to take one or more actions, in response to verification of the validity or allowability of the previously determined distance.

2. The method of claim 1, wherein the determination if the distance is valid or allowable comprises determining whether the second set of at least one second signal corresponds to the function applied to the first set of at least one first signal.

3. The method of claim 1, wherein the random sequence is generated in accordance with at least one cryptographic key associated with at least one of the first device and the second device.

4. The method of claim 1, wherein the function comprises XORing.

5. The method of claim 1, wherein the function comprises determining whether or not a signal is transmitted.

6. The method of claim 2, wherein the determination of whether the second set of at least one second signal corresponds to the function applied to the first set of at least one first signal comprises performing a statistical analysis on the second set of at least one second signal.

7. The method of claim 1, wherein the second device transmits the second set of at least one second signal within a defined time period after the second device receives the first set of at least one first signal.

8. The method of claim 7, wherein the defined time period comprises 10 microseconds.

9. The method of claim 1, wherein the first set of at least one first signal comprises a modulated signal.

10. The method of claim 9, wherein the modulated signal comprises a phase shift keying modulated signal, an on/off keying modulated signal, a frequency shift keying modulated signal, or a time shift keying modulated signal.

11. The method of claim 1, wherein the first set of at least one first signal comprises a defined sequence of pulses.

12. The method of claim 1, wherein the first set of at least one first signal comprises at least one ultra-wideband pulse.

13. The method of claim 12, wherein each ultra-wideband pulse has a fractional bandwidth on the order of 20% or more, has a bandwidth on the order of 500 MHz or more, or has a fractional bandwidth on the order of 20% or more and has a bandwidth on the order of 500 MHz or more.

14. The method of claim 1, wherein the transmission of the first set of at least one first signal and the reception of the second set of at least one second signal are via an air interface of a personal area network or an air interface of a body area network.

15. An apparatus for verifying a distance to a device, comprising:
    a distance determiner adapted to determine the distance between the apparatus and the device;
    a comparator adapted to compare the determined distance to a threshold maximum acceptable distance to determine if the determined distance is equal to or less than the threshold maximum acceptable distance;
    a transmitter adapted to transmit, after the determination of the distance and that the determined distance is equal to or less than the threshold maximum acceptable distance, a first set of at least one first signal to the device, the first set of at least one signal including a random sequence unknown to the device;
    a receiver adapted to receive a second set of at least one second signal transmitted by the device in response to the first set of at least one first signal, the second set of at least one second signal generated by applying a function to the random sequence of the first set of at least one first signal; and
    a verifier adapted to determine, based on an actual round-trip time from transmission of the first set of at least one first signal to reception of the second set of at least one second signal and an expected round-trip time for the previously determined distance, whether the distance between the apparatus and the device is valid or allowable and to cause the device to take one or more actions, in response to verification of the validity or allowability of the previously determined distance.

16. The apparatus of claim 15, wherein the verifier is further adapted to determine whether the second set of at least one second signal corresponds to the function applied to the first set of at least one first signal.

17. The apparatus of claim 15, wherein the random sequence is generated in accordance with at least one cryptographic key associated with at least one of the apparatus and the device.

18. The apparatus of claim 15, wherein the function comprises XORing.

19. The apparatus of claim 15, wherein the function comprises determining whether or not a signal is transmitted.

20. The apparatus of claim 16, wherein the verifier is further adapted to perform a statistical analysis on the second set of at least one second signal to determine whether the second set of at least one second signal corresponds to the function applied to the first set of at least one first signal.

21. The apparatus of claim 15, wherein the device transmits the second set of at least one second signal within a defined time period after the device receives the first set of at least one first signal.

22. The apparatus of claim 21, wherein the defined time period comprises 10 microseconds.

23. The apparatus of claim 15, wherein the first set of at least one first signal comprises a modulated signal.

24. The apparatus of claim 23, wherein the modulated signal comprises a phase shift keying modulated signal, an on/off keying modulated signal, a frequency shift keying modulated signal, or a time shift keying modulated signal.

25. The apparatus of claim 15, wherein the first set of at least one first signal comprises a defined sequence of pulses.

26. The apparatus of claim 15, wherein the first set of at least one first signal comprises at least one ultra-wideband pulse.

27. The apparatus of claim 26, wherein each ultra-wideband pulse has a fractional bandwidth on the order of 20% or more, has a bandwidth on the order of 500 MHz or more, or has a fractional bandwidth on the order of 20% or more and has a bandwidth on the order of 500 MHz or more.

28. The apparatus of claim 15, wherein the transmitter is adapted to transmit via an air interface of a personal area network or an air interface of a body area network and the receiver is adapted to receive via the air interface of the personal area network or the air interface of the body area network.

29. An apparatus for verifying a distance, comprising:
means for determining the distance between the apparatus and a device;
means for comparing the determined distance to a threshold maximum acceptable distance to determine if the determined distance is equal to or less than the threshold maximum acceptable distance;
means for transmitting, after the determination of the distance and that the determined distance is equal to or less than the threshold maximum acceptable distance, a first set of at least one first signal to the device, the first set of at least one signal including a random sequence unknown to the device;
means for receiving a second set of at least one second signal transmitted by the device in response to the first set of at least one first signal, the second set of at least one second signal generated by applying a function to the random sequence of the first set of at least one first signal; and means for determining, based on a round-trip time from transmission of the first set of at least one first signal to reception of the second set of at least one second signal, whether the previously determined distance between the first device and the second device is valid or allowable; and
means for causing the second device to take one or more actions, in response to verification of the validity or allowability of the previously determined distance.

30. The apparatus of claim 29, wherein the means for determining determines whether the second set of at least one second signal corresponds to the function applied to the first set of at least one first signal.

31. The apparatus of claim 29, wherein the random sequence is generated in accordance with at least one cryptographic key associated with at least one of the apparatus and the device.

32. The apparatus of claim 29, wherein the function comprises XORing.

33. The apparatus of claim 29, wherein the function comprises determining whether or not a signal is transmitted.

34. The apparatus of claim 30, wherein the means for determining performs a statistical analysis on the second set of at least one second signal to determine whether the second set of at least one second signal corresponds to the function applied to the first set of at least one first signal.

35. The apparatus of claim 29, wherein the device transmits the second set of at least one second signal within a defined time period after the device receives the first set of at least one first signal.

36. The apparatus of claim 35, wherein the defined time period comprises 10 microseconds.

37. The apparatus of claim 29, wherein the first set of at least one first signal comprises a modulated signal.

38. The apparatus of claim 37, wherein the modulated signal comprises a phase shift keying modulated signal, an on/off keying modulated signal, a frequency shift keying modulated signal, or a time shift keying modulated signal.

39. The apparatus of claim 29, wherein the first set of at least one first signal comprises at least one random or pseudorandom signal.

40. The apparatus of claim 29, wherein the first set of at least one first signal comprises a defined sequence of pulses.

41. The apparatus of claim 29, wherein the first set of at least one first signal comprises at least one ultra-wideband pulse.

42. The apparatus of claim 41, wherein each ultra-wideband pulse has a fractional bandwidth on the order of 20% or more, has a bandwidth on the order of 500 MHz or more, or has a fractional bandwidth on the order of 20% or more and has a bandwidth on the order of 500 MHz or more.

43. The apparatus of claim 29, wherein the means for transmitting transmits and the means for receiving receives via an air interface of a personal area network or an air interface of a body area network.

44. A non-transient computer-readable medium comprising instructions operational in a first device verifying a distance to a second device, which when executed by a processor causes the processor to:
determine a distance between the first device and the second device;
compare the determined distance to a threshold maximum acceptable distance to determine if the determined distance is equal to or less than the threshold maximum acceptable distance;
transmit, after the determination of the distance and that the determined distance is equal to or less than the threshold maximum acceptable distance, a first set of at least one first signal to the second device, the first set of at least one signal including a random sequence unknown to the second device;

receive a second set of at least one second signal transmitted by the second device in response to the first set of at least one first signal, the second set of at least one second signal generated by applying a function to the random sequence of the first set of at least one first signal;

determining, based on an actual round-trip time from transmission of the first set of at least one first signal to reception of the second set of at least one second signal and an expected round-trip time for the previously determined distance, whether the previously determined distance between the first device and the second device is valid or allowable; and causing the second device to take one or more actions, in response to verification of the validity or allowability of the previously determined distance.

45. A headset for processing signals, comprising:

a distance determiner adapted to determine a distance between the headset and a device;

a comparator adapted to compare the determined distance to a threshold maximum acceptable distance to determine if the determined distance is equal to or less than the threshold maximum acceptable distance;

a transmitter adapted to transmit, after the determination of the distance and that the determined distance is equal to or less than the threshold maximum acceptable distance, a first set of at least one first signal to the device, the first set of at least one signal including a defined sequence unknown to the device;

a receiver adapted to receive a second set of at least one second signal transmitted by the device in response to the first set of at least one first signal, the second set of at least one second signal generated by applying a function to the defined sequence of the first set of at least one first signal;

a verifier adapted to determine, based on an actual round-trip time from transmission of the first set of at least one first signal to reception of the second set of at least one second signal and an expected round-trip time for the previously determined distance, whether the distance between the headset device and the device is valid or allowable and to cause the device to take one or more actions, in response to verification of the validity or allowability of the previously determined distance; and a transducer adapted to provide an audible output based on a signal received via the receiver.

46. A watch for processing signals, comprising:

a distance determiner adapted to determine a distance between the watch and a device;

a comparator adapted to compare the determined distance to a threshold maximum acceptable distance to determine if the determined distance is equal to or less than the threshold maximum acceptable distance;

a transmitter adapted to transmit, after the determination of the distance and that the determined distance is equal to or less than the threshold maximum acceptable distance, a first set of at least one first signal to the device, the first set of at least one signal including a defined sequence unknown to the device;

a receiver adapted to receive a second set of at least one second signal transmitted by the device in response to the first set of at least one first signal, the second set of at least one second signal generated by applying a function to the random sequence of the first set of at least one first signal;

a verifier adapted to determine, based on an actual round-trip time from transmission of the first set of at least one first signal to reception of the second set of at least one second signal and an expected round-trip time for the previously determined distance, whether the distance between the watch and the device is valid or allowable and to cause the device to take one or more actions, in response to verification of the validity or allowability of the previously determined distance; and a display adapted to provide a visual output based on a signal received via the receiver.

47. A medical device for processing signals, comprising:

a distance determiner adapted to determine a distance between the medical device and a second device;

a comparator adapted to compare the determined distance to a threshold maximum acceptable distance to determine if the determined distance is equal to or less than the threshold maximum acceptable distance;

a transmitter adapted to transmit, after the determination of the distance and that the determined distance is equal to or less than the threshold maximum acceptable distance, a first set of at least one first signal to the second device, the first set of at least one signal including a defined sequence unknown to the second device;

a receiver adapted to receive a second set of at least one second signal transmitted by the second device in response to the first set of at least one first signal, the second set of at least one second signal generated by applying a function to the defined sequence of the first set of at least one first signal;

a verifier adapted to determine, based on an actual round-trip time from transmission of the first set of at least one first signal to reception of the second set of at least one second signal and an expected round-trip time for the previously determined distance, whether the distance between the medical device and the device is valid or allowable and to cause the device to take one or more actions, in response to verification of the validity or allowability of the previously determined distance; and a sensor adapted to generate sensed data to be transmitted via the transmitter.

48. A method of responding to a signal, comprising:

receiving a first set of at least one first signal at a second device from a first device after a determination of a distance between the first device and the second device and a determination by the first device that the determined distance is equal to or less than a threshold maximum acceptable distance, the first set of at least one signal including a random sequence and wherein the first set of at least one first signal is received at a first time;

generating a second set of at least one second signal by applying a function to the random sequence, based on a signal response scheme known to the first device and the second device; and transmitting the second set of at least one second signal to the first device at a second time that is within a defined time period after the first time causing the previously determined distance between the first device and the second device to be verified, the first device verifying that the previously determined distance is valid or allowable based on an actual round-trip time from transmission of the first set of at least one first signal to reception of the second set of at least one second signal and an expected round-trip time for the previously determined distance.

49. The method of claim 48, wherein the random sequence is generated in accordance with at least one cryptographic key associated with at least one of the first device and the second device.

50. The method of claim 48, wherein the function comprises XORing.

51. The method of claim 48, wherein the function comprises determining whether or not a signal is transmitted.

52. The method of claim 48, wherein:
the first time is associated with receipt of a specified signal from the first set of at least one first signal; and
a specified signal from the second set of at least one second signal is transmitted at the second time.

53. The method of claim 48, wherein the defined time period comprises 10 microseconds.

54. The method of claim 48, wherein the first set of at least one first signal comprises at least one phase shift keying modulated signal, at least one on/off keying modulated signal, at least one frequency shift keying modulated signal, or at least one time shift keying modulated signal.

55. The method of claim 48, wherein the first set of at least one first signal comprises at least one random or pseudorandom signal.

56. The method of claim 48, wherein the first set of at least one first signal comprises a defined sequence of pulses.

57. The method of claim 48, wherein the first set of at least one first signal comprises ultra-wideband pulses.

58. The method of claim 57, wherein each ultra-wideband pulse has a fractional bandwidth on the order of 20% or more, has a bandwidth on the order of 500 MHz or more, or has a fractional bandwidth on the order of 20% or more and has a bandwidth on the order of 500 MHz or more.

59. The method of claim 48, wherein the reception of the first set of at least one first signal and the transmission of the second set of at least one second signal are via an air interface of a personal area network or an air interface of a body area network.

60. An apparatus for responding to a signal, comprising:
a receiver adapted to receive a first set of at least one first signal after a determination of a distance between the apparatus and a device and a determination by the device that the determined distance is equal to or less than a threshold maximum acceptable distance, the first set of at least one signal including a random sequence and wherein the first set of at least one first signal is received at a first time;
a signal generator adapted to generate a second set of at least one second signal by applying a function to the random sequence, based on a signal response scheme known to the apparatus and the device; and
a transmitter adapted to transmit the second set of at least one second signal to the device at a second time that is within a defined time period after the first time causing the previously determined distance between the apparatus and the device to be verified, the device verifying that the previously determined distance is valid or allowable based on an actual round-trip time from transmission of the first set of at least one first signal to reception of the second set of at least one second signal and an expected round-trip time for the previously determined distance.

61. The apparatus of claim 60, wherein the random sequence is generated in accordance with at least one cryptographic key associated with at least one of the apparatus and the device.

62. The apparatus of claim 60, wherein the function comprises XORing.

63. The apparatus of claim 60, wherein the function comprises determining whether or not a signal is transmitted.

64. The apparatus of claim 60, wherein:
the first time is associated with receipt of a specified signal from the first set of at least one first signal; and
the transmitter is further adapted to transmit a specified signal from the second set of at least one second signal at the second time.

65. The apparatus of claim 60, wherein the defined time period comprises 10 microseconds.

66. The apparatus of claim 60, wherein the first set of at least one first signal comprises at least one phase shift keying modulated signal, at least one on/off keying modulated signal, at least one frequency shift keying modulated signal, or at least one time shift keying modulated signal.

67. The apparatus of claim 60, wherein the first set of at least one first signal comprises at least one random or pseudorandom signal.

68. The apparatus of claim 60, wherein the first set of at least one first signal comprises a defined sequence of pulses.

69. The apparatus of claim 60, wherein the first set of at least one first signal comprises ultra-wideband pulses.

70. The apparatus of claim 69, wherein each ultra-wideband pulse has a fractional bandwidth on the order of 20% or more, has a bandwidth on the order of 500 MHz or more, or has a fractional bandwidth on the order of 20% or more and has a bandwidth on the order of 500 MHz or more.

71. The apparatus of claim 60, wherein the transmitter is adapted to transmit via an air interface of a personal area network or an air interface of a body area network and the receiver is adapted to receive via the air interface of the personal area network or the air interface of the body area network.

72. An apparatus for responding to a signal, comprising:
means for receiving a first set of at least one first signal after a determination of a distance between the apparatus and a device and a determination by the device that the determined distance is equal to or less than a threshold maximum acceptable distance, the first set of at least one signal including a random sequence and wherein the first set of at least one first signal is received at a first time;
means for generating a second set of at least one second signal by applying a function to the random sequence, based on a signal response scheme known to the apparatus and the device; and
means for transmitting the second set of at least one second signal to the device at a second time that is within a defined time period after the first time causing the previously determined distance between the apparatus and the device to be verified, the device verifying that the previously determined distance is valid or allowable based on an actual round-trip time from transmission of the first set of at least one first signal to reception of the second set of at least one second signal and an expected round-trip time for the previously determined distance.

73. The apparatus of claim 72, wherein the random sequence is generated in accordance with at least one cryptographic key associated with at least one of the apparatus and the device.

74. The apparatus of claim 72, wherein the function comprises XORing.

75. The apparatus of claim 72, wherein the function comprises determining whether or not a signal is transmitted.

76. The apparatus of claim 72, wherein:
the first time is associated with receipt of a specified signal from the first set of at least one first signal; and
the means for transmitting transmits a specified signal from the second set of at least one second signal at the second time.

77. The apparatus of claim 72, wherein the defined time period comprises 10 microseconds.

78. The apparatus of claim 72, wherein the first set of at least one first signal comprises at least one phase shift keying modulated signal, at least one on/off keying modulated signal, at least one frequency shift keying modulated signal, or at least one time shift keying modulated signal.

79. The apparatus of claim 72, wherein the first set of at least one first signal comprises at least one random or pseudorandom signal.

80. The apparatus of claim 72, wherein the first set of at least one first signal comprises a defined sequence of pulses.

81. The apparatus of claim 72, wherein the first set of at least one first signal comprises ultra-wideband pulses.

82. The apparatus of claim 81, wherein each ultra-wideband pulse has a fractional bandwidth on the order of 20% or more, has a bandwidth on the order of 500 MHz or more, or has a fractional bandwidth on the order of 20% or more and has a bandwidth on the order of 500 MHz or more.

83. The apparatus of claim 72, wherein the means for transmitting transmits and the means for receiving receives via an air interface of a personal area network or an air interface of a body area network.

84. A computer-program product for responding to a signal, comprising:
non-transient computer-readable medium comprising codes executable by at least one computer to:
receive a first set of at least one first signal after a determination of a distance between a first device and a second device and a determination by the first device that the determined distance is equal to or less than a threshold maximum acceptable distance, the first set of at least one signal including a random sequence and wherein the first set of at least one first signal is received at a first time;
generate a second set of at least one second signal by applying a function to the random sequence, based on a signal response scheme known to the first device and the second device; and
transmit the second set of at least one second signal to the second device at a second time that is within a defined time period after the first time causing the previously determined distance between the first device and the second device to be verified, the second device verifying that the previously determined distance is valid or allowable based on an actual round-trip time from transmission of the first set of at least one first signal to reception of the second set of at least one second signal and an expected round-trip time for the previously determined distance.

85. A headset for processing signals, comprising:
a receiver adapted to receive a first set of at least one first signal after a determination of a distance between the headset and a device and a determination by the device that the determined distance is equal to or less than a threshold maximum acceptable distance, the first set of at least one signal including a random sequence and wherein the first set of at least one first signal is received at a first time;
a signal generator adapted to generate a second set of at least one second signal by applying a function to the random sequence, based on a signal response scheme known to the headset and the device;
a transmitter adapted to transmit the second set of at least one second signal to the device at a second time that is within a defined time period after the first time causing the previously determined distance between the headset and the device to be verified, the device verifying that the previously determined distance is valid or allowable based on an actual round-trip time from transmission of the first set of at least one first signal to reception of the second set of at least one second signal and an expected round-trip time for the previously determined distance; and
a transducer adapted to provide an audible output based on a signal received via the receiver.

86. A watch for processing signals, comprising:
a receiver adapted to receive a first set of at least one first signal after a determination of a distance between the watch and a device and a determination by the device that the determined distance is equal to or less than a threshold maximum acceptable distance, the first set of at least one signal including a defined sequence and wherein the first set of at least one first signal is received at a first time;
a signal generator adapted to generate a second set of at least one second signal by applying a function to the random sequence, based on a signal response scheme known to the watch and the device;
a transmitter adapted to transmit the second set of at least one second signal to the device at a second time that is within a defined time period after the first time causing the previously determined distance between the watch and the device to be verified, the device verifying that the previously determined distance is valid or allowable based on an actual round-trip time from transmission of the first set of at least one first signal to reception of the second set of at least one second signal and an expected round-trip time for the previously determined distance; and
a display adapted to provide a visual output based on a signal received via the receiver.

87. A medical device for processing signals, comprising:
a receiver adapted to receive a first set of at least one first signal after a determination of a distance between the medical device and a device and a determination by the device that the determined distance is equal to or less than a threshold maximum acceptable distance, the first set of at least one signal including a random sequence and wherein the first set of at least one first signal is received at a first time;
a signal generator adapted to generate a second set of at least one second signal by applying a function to the random sequence, based on a signal response scheme known to the medical device and the device;
a transmitter adapted to transmit the second set of at least one second signal to the device at a second time that is within a defined time period after the first time causing the previously determined distance between the medical device and the second device to be verified, the device verifying that the previously determined distance is valid or allowable based on an actual round-trip time from transmission of the first set of at least one first signal to reception of the second set of at least one second signal and an expected round-trip time for the previously determined distance; and
a sensor adapted to generate sensed data to be transmitted via the transmitter.

88. The method of claim 1, wherein verification of the validity or allowability of the previously determined distance is predicated upon the second device transmitting the second set of the at least one second signal within a defined period of time after receiving the first set of the at least one first signal from the first device.

89. The apparatus of claim 15, wherein verification of the validity or allowability of the previously determined distance is predicated upon the device transmitting the second set of the at least one second signal within a defined period of time after receiving the first set of the at least one first signal from the apparatus.

90. The apparatus of claim 29, wherein verification of the validity or allowability of the previously determined distance is predicated upon the device transmitting the second set of the at least one second signal within a defined period of time after receiving the first set of the at least one first signal from the apparatus.

91. The computer-readable medium of claim 44, wherein verification of the validity or allowability of the previously determined distance is predicated upon the second device transmitting the second set of the at least one second signal within a defined period of time after receiving the first set of the at least one first signal from the first device.

* * * * *